United States Patent
Messina et al.

(10) Patent No.: US 9,199,577 B1
(45) Date of Patent: Dec. 1, 2015

(54) REMOTE CONTROLLED MIRROR FOR HEAVY EQUIPMENT

(71) Applicants: Thomas A. Messina, Fremont, OH (US); Adam Reau, Toledo, OH (US); Robert Skilliter, III, Curtice, OH (US)

(72) Inventors: Thomas A. Messina, Fremont, OH (US); Adam Reau, Toledo, OH (US); Robert Skilliter, III, Curtice, OH (US)

(73) Assignee: Chantilly Corporation, Toledo, OH (US)

(*) Notice: Subject to any disclaimer, the term of this patent is extended or adjusted under 35 U.S.C. 154(b) by 268 days.

(21) Appl. No.: 14/033,421

(22) Filed: Sep. 20, 2013

Related U.S. Application Data

(60) Provisional application No. 61/704,321, filed on Sep. 21, 2012.

(51) Int. Cl.
*G02B 7/182* (2006.01)
*B60R 1/062* (2006.01)

(52) U.S. Cl.
CPC ...................................... *B60R 1/062* (2013.01)

(58) Field of Classification Search
CPC .......... B60R 1/006; B60R 1/007; B60R 1/02; B60R 1/025; B60R 1/06; B60R 1/0605; B60R 1/0607; B60R 1/0612; B60R 1/0615; B60R 1/0617; B60R 1/062; B60R 1/0625; B60R 1/064; B60R 1/066; B60R 1/068; B60R 1/07; B60R 1/072; B60R 1/074; B60R 1/078
USPC ......... 359/838–839, 849, 860, 864, 892, 890; 296/190.1, 190.08
See application file for complete search history.

(56) References Cited

U.S. PATENT DOCUMENTS

| | | | | |
|---|---|---|---|---|
| 3,751,141 A | * | 8/1973 | Brown | 359/873 |
| 3,936,158 A | * | 2/1976 | Cianciolo et al. | 359/873 |
| 4,440,039 A | * | 4/1984 | Bramer | 74/502.1 |
| 2013/0293975 A1 | * | 11/2013 | Englander et al. | 359/872 |
| 2014/0153125 A1 | * | 6/2014 | Ebert | 359/877 |
| 2014/0192432 A1 | * | 7/2014 | Dalton et al. | 359/877 |

* cited by examiner

*Primary Examiner* — Ricky Mack
*Assistant Examiner* — Robert E Tallman
(74) *Attorney, Agent, or Firm* — Pepper Hamilton LLP

(57) ABSTRACT

A remote controlled mirror is provided which comprises: 1) a mirror assembly, 2) a dual axis pivot bracket, and 3) a fixed mounting bracket and further comprises a horizontal drive actuator and a vertical drive actuator. The remote controlled mirror is for use in heavy equipment and comprises mirror that weigh over 10 pounds, in some embodiments 50 pounds or more and in some embodiments 80 pound or more.

21 Claims, 7 Drawing Sheets

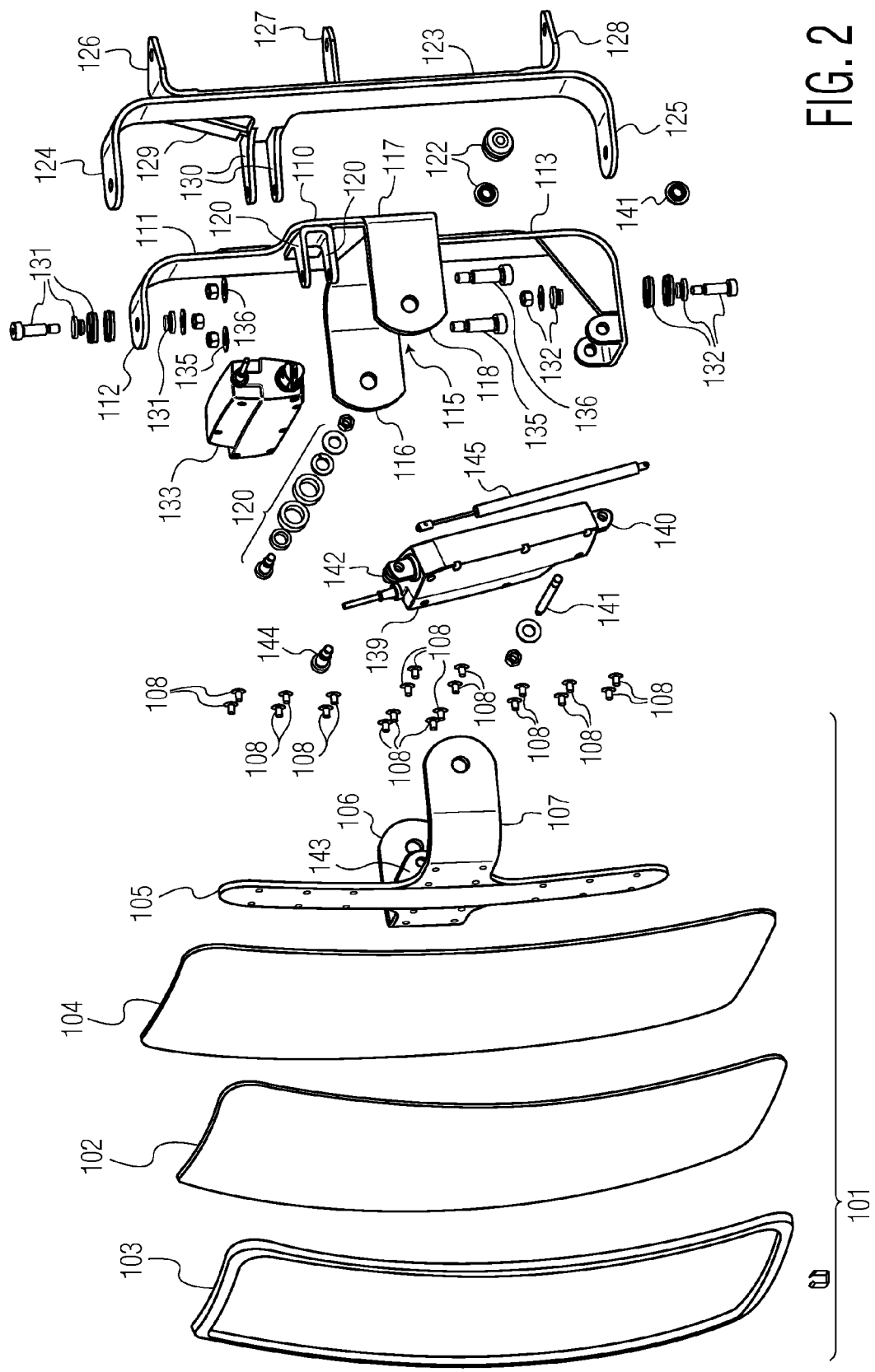

REMOTE CONTROLLED MIRROR FOR HEAVY EQUIPMENT

CROSS REFERENCE TO RELATED APPLICATIONS

This application claims priority to U.S. Provisional Application No. 61/704,321 filed Sep. 21, 2012, which is incorporated herein by reference.

FIELD OF THE INVENTION

Remote controlled mirrors are provided which are particularly useful for heavy mirrors used with heavy equipment.

BACKGROUND OF THE INVENTION

Heavy equipment including, but not limited to, earth moving equipment, construction equipment and vehicles, large off-road trucks and vehicles, surface mining equipment and vehicles, mineral and earth processing equipment and other equipment used in quarries and mines, and other vehicles and large sized equipment frequently used in off road applications and not suitable for use on existing roadways often employ very large, very heavy mirrors that are used by operators when operating the vehicles or equipment. These mirrors are typically located at a distance from the operator's seat or position that places them beyond reach when the operator is in the operator position. Accordingly, it is not possible for the operator to manually adjust the mirror to the proper angle from the location where the operator is positioned when the equipment is being operated.

Given the size of the equipment and the distance between the operator position and the mirror, mirror adjustment is either a two person task or, in a one person adjustment procedure, mirror adjustment requires the operator to leave the operating position, move to and adjust the angle/position of the mirror, return to the operator position to check whether the adjustment was appropriate and repeat as necessary until the adjustment is completed. Failure to have properly adjusted mirrors can results in inefficiencies and performance errors by the operating including the possibility of unsafe and/or inefficient operation including the potential for catastrophic accidents.

Remote controlled mirrors that are typically used in passenger and small off road vehicles are unsuitable for use in large heavy vehicles and equipment used in off road applications. The challenges presented by the size of the mirrors, by the conditions that occur when the large heavy vehicles and equipment is in operation, and the environment in which the large heavy vehicles and equipment is typically used, render small vehicle remote control mirror designs inadequate.

The mirrors used in large heavy vehicle and equipment applications are very heavy and the weight of the mirrors presents a significant challenge to designing remote controlled mirror system. Weights in excess of 10-25 pounds for mirrors used on heavy equipment are not uncommon with some being up to 80 pounds and some up to 125 pounds or more. Supporting and precisely moving and stopping movement of such large, heavy mirrors pose difficulties and problems not present when designing mirrors to be used in roadable vehicles. Being able to move and "precisely" stop mirrors weighing in excess of 10 pounds, in excess of 20 pounds, in excess of 50 pounds, in excess of 80 pounds, in excess of 100 pounds or in excess of 125 pounds is extremely difficult. The exterior-mounted rearview/sideview mirrors used in road-able vehicles such as cars, semi-tractors, RV's, are relatively small and weigh only a few pounds, typically 2-10 pounds. Typical passenger vehicle mirror designs employed in remote controlled mirror for these smaller applications are unsuitable because they are not designed to operate with such large heavy mirrors and the loads that are associated with supporting and remotely moving such mirrors. Due to the extra weight of the mirrors used in heavy equipment applications, simply increasing the size of passenger remote control mirror designs is impractical when taking into account the need to use the remote control mirror in place of existing manually adjustable mirrors. The heavy weight of the mirrors causes significant problems in designing remote controlled mirrors, especially because it is desirable to minimize difference in weight between remote controlled mirrors and manually adjusted mirrors, the weight is capable of being supported by structures present on existing equipment. It is also not feasible to do so in many instances because the heavy equipment is not simply a large version of passenger vehicle. Heavy equipment creates conditions that effect and create problems for remote controlled mirrors that are not comparable to passenger vehicle applications. Moreover, the environment and conditions in which heavy vehicles are used create problems and design challenges that don't exist or are not addressed in comparable to passenger vehicle applications.

The several specific factors to be considered in design of remote controlled mirrors for heavy equipment include harmonic vibration, loads arising from shock forces, high likelihood of impacts with debris, high levels of air borne particulates and extreme temperatures. Problems are encountered in the off road use of large heavy equipment include the challenges caused by the mirror vibration due to the type and level of vibration caused by engines used in heavy equipment. The overall system needs to be able to withstand the harmonic frequency's being introduced via the equipment. Remote controlled mirrors used in heavy equipment must be robust enough to withstand the static and dynamic forces of an off road environment and protect both the mirrors surface and the operating systems ability to function and remain in operational condition over a lifetime comparable to that of a manually adjusted mirror. Additionally, mirrors used in heavy equipment are often repeatedly struck by falling and flying stones and rocks and must be designed to withstand such occurrences and continue to operate and function properly. Moreover, dusty and dirty conditions with high levels of particulates in the atmosphere are common in locations where heavy vehicles and equipment are used and mirror designs must ensure that such conditions do not interfere with continued proper operation or cause premature breakdown or malfunctioning. Further, heavy equipment is often deployed and regularly operated in locations that experience extreme weather conditions. Remote controlled mirrors used in heavy equipment can be subjected to extreme temperatures.

Vibration in heavy vehicles and equipment causes problems not experienced using small mirrors such as those used in in passenger and small off road vehicles. The engines used to power large heavy vehicles and equipment create vibration that greatly exceeds the vibration produced by smaller vehicles. The distance between mirror and operator position is significantly greater than distances in small vehicle application. The need for a mirror's reflective surface to remain motionless (not vibrate) while the heavy vehicle of equipment is moving or idling is among the most important aspects of mirror design for heavy equipment. The reflected image from a slightly vibrating reflective surface is distorted. In addition, the vibration makes it very difficult for the operator to properly focus his/hers eyes on the image. The vibration caused by such large engines must be addressed and mitigated in the design of remote controlled mirrors for heavy equipment to ensure that the mirror function properly when the engine is running. The mirrors designs used in these applications must not only meet the unusually large size and weight requirements but also remain functional when the common amount of vibration associated with this type of equipment is present. Passenger car mirrors are not designed to function in conditions having vibration typical in heavy equipment use.

Moreover, when such heavy equipment is in use and/or motion, shock forces can occur which further cause movement and additional load on weight bearing structures attached to such equipment. Mirror designs must be of sufficient strength to withstand the additional loads on components and shock forces that are common cannot cause operational failure and/or damage to the remote controlled mirror or components therein. The remote controlled mirror design and the components used must be able to continue to operate following exposure to g-forces of +5 g or that are produced by the additional load which commonly results from shocks that occur in the ordinary usage of the heavy equipment. Given the heavy weight of the mirrors, the additional loads routinely produced by shock forces create the need for a design which can not only withstand the large force created but which can repeatedly withstand such forces and remain in service. Remote controlled mirrors designed for use in passenger cars and small off-road vehicles do not address the potential problems that occur due to the increased load caused by shock forces.

The amount of debris which routinely falls or is thrown about the heavy equipment tossed is quite high relative to that commonly encountered by passenger vehicles given that the heavy equipment is typically used in excavation, mining and construction sites. The remote controlled mirror is expected to be durable under such conditions.

Further, the environment in which heavy equipment are deployed, such as excavation, mining and construction sites, have large amounts of dust, dirt, particulates and other environmental factors that require a more robust design that simply a large scale version of a passenger mirror design affords.

It is not uncommon for heavy equipment to be used in arctic and near-arctic conditions as well as in desert conditions. The design must be able to remain operational at extreme temperatures and withstand the various forces, impacts and environmental conditions at such temperatures.

There is a need for a remote controlled mirror for use in heavy equipment which can be adjusted by the operator from the operator position, which has a mirror that is large enough to be effective when used with heavy equipment, and which can function adequately under the vibration and environmental conditions and shock forces common in the off road applications of such equipment.

SUMMARY OF THE PRESENT INVENTION

In some embodiments, a remote controlled mirror is provided that includes a large heavy mirror for use on a large heavy vehicle or other heavy equipment. The remote controlled mirror provides the required reliable, precision performance under off-road conditions. The high levels of vibration caused by large motorized equipment do not compromise the functionality of the remote controlled mirror. It is able to withstand shock induced high loads and can operate reliably in environmental condition having high levels of particulates in the air. The remote controlled mirror is specifically adapted and designed for large heavy mirrors for which remote control adjustment is needed due to a dearth of designs available to meet the specific challenges posed.

The remote controlled mirror comprises a dual axis pivot bracket that provides the structural features needed to function reliable and with precision, a mirror assembly that includes the heavy mirror, a fixed mounting bracket for attaching the remote controlled mirror to the heavy equipment, and two drive actuators which can be controlled remotely to adjust the mirror. The remote controlled mirror is particularly useful for adjusting large heavy mirrors throughout the multi-direction range of angles required by heavy equipment operators.

The dual axis pivot bracket provides a strong framework that can be used to perform the required functions under extreme conditions with large, heavy mirrors while allowing for simplicity in design. The structure and materials of the dual axis pivot bracket is configured with longitudinally extending arms perpendicular to laterally extending arms. The longitudinally extending arms and the laterally extending arms provide two pair of attachment points that form axes perpendicular to each other. The fixed mounting bracket attaches pivotably to either the longitudinally extending arms or laterally extending arms and the mirror assembly is attached to the other of the two. The attachment of the fixed mounting bracket or mirror assembly to attachment points on a pair of extending arms allows for movement about the axis formed by the attachment.

In some embodiments, the remote controlled mirror has only six moving connections: two connections between the dual axis pivot bracket and the fixed mounting bracket, two connections between the dual axis pivot bracket and the mirror assembly, one connection between the vertical drive actuator and one connection between the horizontal drive actuator. Some embodiments have two additional moving connections: one linking a pre-load mechanism to the dual axis pivot bracket and one linking the pre-load mechanism to the mirror assembly. Some embodiments provide two connections between the vertical drive actuator and two connections between the horizontal drive actuator. Whether 6 or less, 7, 8, 9, 10 or more connections, the low number of moving connections, each of which involves a small range of motion contributes to the robust performance, reliability and durability of the remote controlled mirror. Have so few moving connections which each have such limited ranges of motion provides fewer points for failure as well as lower overall weight. The low weight of the design allows for the added weight of more durable and reliable connector hardware.

When the fixed mounting bracket is affixed to a heavy vehicle or piece of equipment, the attached dual axis pivot bracket can move either horizontally about a vertical axis or vertically about a horizontal axis depending upon whether the mounting bracket is attached to the pair of longitudinally extending arms and the pair of laterally extending arms. The mirror assembly is pivotably attached to the pair of extending arms not attached to the fixed mounting bracket and can move either horizontally about a vertical axis or vertically about a horizontal axis depending upon whether the mirror assembly is attached to the pair of longitudinally extending arms and the pair of laterally extending arms. In this way, the dual axis pivot bracket including the attached mirror assembly can move about one axis while the attached mirror assembly can move about the axis perpendicular to the other. The attachment points on the dual axis pivot bracket are referred to as pivot bracket connection tabs.

The dual axis pivot bracket comprises two pairs of pivot bracket connection tabs: one for attaching the mirror assembly dual axis pivot bracket and one for attaching the fixed mounting bracket to the dual axis pivot bracket. The two pairs of pivot bracket connection tabs comprise a first pair of pivot bracket connection tabs and a second pair of pivot bracket connection tabs. When the first pair of pivot bracket connection tabs comprises a first longitudinal pivot bracket connection tab and a second longitudinal pivot bracket connection tab, and the other of the two pairs of pivot bracket connection tabs comprises a first lateral pivot bracket connection tab and a second lateral pivot bracket connection tab.

In some embodiments, the mirror pivot tabs of the mirror assembly are attached to the first longitudinal pivot bracket connection tab and a second longitudinal pivot bracket connection tab of the dual axis pivot bracket. In such embodiments, the first mounting bracket-pivot tab and the second mounting bracket-pivot tab of the fixed mounting bracket are attached to the first lateral pivot bracket connection tab and a second lateral pivot bracket connection tab of the dual axis pivot bracket. In such embodiments, a horizontal drive actuator is provided which is attached to the dual axis pivot bracket and the mirror assembly. The first drive actuator connector tab of the horizontal drive actuator is attached to the pivot bracket-to-horizontal actuator connector tab of the dual axis pivot bracket and the second drive actuator of the horizontal drive actuator is attached to the mirror assembly-to-actuator connector tab. A vertical drive actuator is provided which is attached to the dual axis pivot bracket and the mounting bracket. The first drive actuator connector tab of the vertical drive actuator is attached to the pivot bracket-to-vertical actuator connector tab of the dual axis pivot bracket and the second drive actuator of the vertical drive actuator is attached to the mounting bracket-to-actuator connector tab.

In some embodiments, the first mounting bracket-pivot tab and the second mounting bracket-pivot tab of the fixed mounting bracket are attached to the first longitudinal pivot bracket connection tab and a second longitudinal pivot bracket connection tab of the dual axis pivot bracket. In such embodiments, the first mirror-pivot tab and the second mirror-pivot tab of the mirror assembly are attached to the first lateral pivot bracket connection tab and a second lateral pivot bracket connection tab of the dual axis pivot bracket. In such embodiments, a horizontal drive actuator is provided which is attached to the dual axis pivot bracket and the fixed mounting bracket. The first drive actuator connector tab of the horizontal drive actuator is attached to the pivot bracket-to-horizontal actuator connector tab of the dual axis pivot bracket and the second drive actuator of the horizontal drive actuator is attached to the mounting bracket-to-actuator connector tab. A vertical drive actuator is provided which is attached to the dual axis pivot bracket and the mirror assembly. The first drive actuator connector tab of the vertical drive actuator is attached to the pivot bracket-to-vertical actuator connector tab of the dual axis pivot bracket and the second drive actuator of the vertical drive actuator is attached to the mirror assembly-to-actuator connector tab.

In some embodiments, the mounting bracket includes a support rib to spread load at positions where relatively high load is experienced. The pivot bracket-to-horizontal actuator connector tab prevents deformation, breaking and failure when the drive actuated attached near the support rib is activated.

In some embodiments, the vertical drive actuator is attached to the mirror assembly-to-actuator connector tab of the mirror assembly at or near the center of the mirror bracket support base, and the vertical drive actuator is attached to the mirror assembly-to-actuator connector tab of the mirror assembly at or near the center of the mirror bracket support base, and the vertical drive actuator is attached to the pivot bracket-to-vertical actuator connector tab of the dual axis pivot bracket at or near the bottom of the longitudinal pivot bracket arm that extends downward to the position beneath of lateral pivot bracket arms. In some embodiments, a preload mechanism such as a strut, spring, or shock absorber is attached to the mirror assembly and to the dual axis pivot bracket near the vertical drive actuator. Positioning the vertical drive actuator so that one end of the vertical drive actuator is attached toward the center of the mirror assembly and the other end of the vertical drive actuator is attached at or near the bottom of the longitudinal pivot bracket arm that extends downward to the position beneath of lateral pivot bracket arms lowers the center of gravity of the remote controlled mirror and positions the vertical drive actuator to support the load/weight of the mirror. The preload mechanism attached to the mirror assembly and to the dual axis pivot bracket near the vertical drive actuator and roughly parallel to it puts force on the mirror assembly and dual axis pivot bracket. The preload mechanism reduces vibration and backlash caused by the additional load which is generated from shocks during operation of the heavy equipment to which the mirror assembly is attached. The preload mechanism is attached to the mirror assembly at or near the mirror assembly-to-actuator connector tab of the mirror assembly (typically near the center of the mirror assembly), and to the dual axis pivot bracket at or near the pivot bracket-to-vertical actuator connector tab of the dual axis pivot bracket (typically at or near the bottom of the longitudinal pivot bracket arm that extends downward to the position beneath of lateral pivot bracket arms).

The remote control mirror may further comprise a housing to cover the dual axis pivot bracket, actuators, preload mechanism, connectors, and a portion of the mounting bracket wherein the equipment connection tabs may extend from the housing to allow attachment of the housed remote control mirror to the equipment. The housing may provide a recessed position for the mirror assembly such that the housing may minimize exposure of the inner components to environmental substance and conditions.

The remote control mirror may further comprise a remote controller operably linked to each of the actuators. Depending upon the source of force used to adjust the mirror positions, different types of remote controllers may be preferred. Joystick and sets of adjustment switches are examples of remote controllers.

The simplicity of the design allows for a reduction in the total weight of the mirror housing assembly. The reduction in weight allows for more reliable and precise operation and performance as well as durability. The simplicity of moving the mirror about a vertical axis and horizontal axis allows for use of lighter, simpler, more durable materials to be utilized at the points of rotation. The simplicity of the design reduces the likelihood of failure. The simplicity allows for fewer moving parts.

The dual axis pivot bracket is the central feature which is intermediate of a mirror assembly and a mounting bracket. Each of two drive actuators is connected to the dual axis pivot bracket. One of two drive actuators connected to the dual axis pivot bracket is a horizontal drive actuator and moves the dual axis pivot bracket horizontally. One of two drive actuators connected to the dual axis pivot bracket is a vertical drive actuator and moves the dual axis pivot bracket vertically. In some embodiments, the horizontal drive actuator is connected to the dual axis pivot bracket and the mirror assembly, and the vertical drive actuator is connected to the dual axis pivot bracket and fixed mounting bracket. In some embodiments, the vertical drive actuator is connected to the dual axis pivot bracket and the mirror assembly, and the horizontal drive actuator is connected to the dual axis pivot bracket and fixed mounting bracket.

The mirror assembly comprises a large, heavy mirror attached to a mirror back. Also attached to the mirror back are two mirror-pivot tabs included a first mirror-pivot tab and a second mirror pivot tab. The first mirror-pivot tab and the second mirror-pivot tab are configured to pivotably attach the one of the two pairs of pivot bracket connection tabs. In some embodiments, the first mirror-pivot tab and the second mirror-pivot tab are configured to pivotably attach the first longitudinal pivot bracket connection tab and a second longitudinal pivot bracket connection tab. In such embodiments, dual axis pivot bracket is attached to a vertical drive actuator which facilitates vertical movement of the mirror assembly. The vertical drive actuator in such instances is also connected to the mirror assembly. In some embodiments, the first mirror-pivot tab and the second mirror-pivot tab are configured to pivotably attach the first lateral pivot bracket connection tab and a second lateral pivot bracket connection tab. In such embodiments, dual axis pivot bracket is attached to a horizontal drive actuator which facilitates horizontal movement of the mirror assembly. The horizontal drive actuator in such instances is also connected to the mirror assembly.

BRIEF DESCRIPTION OF THE DRAWINGS

FIG. 2 shows a representative remote controlled mirror to which a remote controller can be attached.

DETAILED DESCRIPTION OF THE PREFERRED EMBODIMENTS

Figure 1A:
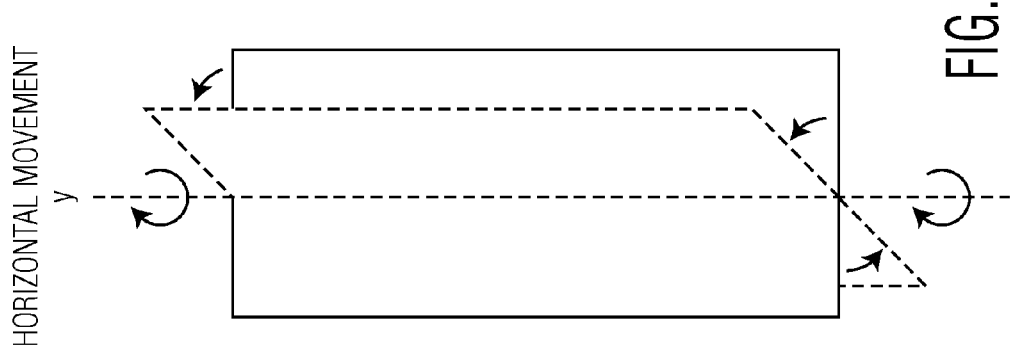
FIGS. 1A, 1B, 1C and 1D show horizontal and vertical movement of a plane about an x axis or a y axis.

The remote controlled mirrors provided herein are suitable for use in heavy equipment as described above including but not limited to heavy off road vehicles. The remote controlled mirrors are typically operated by an equipment operator from an operator's position inside the cab of the heavy equipment. The remote controlled mirrors comprise a mirror of sufficient size that can function effectively when attached to the equipment and allow the operator the range of vision necessary to more efficiently, effectively and safely operate the equipment. Despite mass, weight and size, the remote controlled mirrors can be remotely operated with precision and the movement of the mirror can be precisely started and stopped, allowing the operator to adjust the reflected view provided by the mirror. The remote controlled mirrors minimize vibration of the mirror. The reflective surfaces of the remote controlled mirrors remain essentially motionless and do not vibrate while the equipment is moving or idling, eliminating the slight vibration of the reflective surface that would distort the reflected image as well as make it very difficult for the operator to properly focus his/hers eyes on the image. The remote controlled mirrors can perform and continue to function despite being submitted to additional loads due to shock forces which occur during the use of such equipment. The remote controlled mirrors, which are robust and durable, are designed to withstand the load and stress experienced during operation. The shock forces which occur during the use of such equipment may result in additional g-force on the remote controlled mirror in excess of 5 time standard g-force (i.e. +5 g or 49 N/kg). Under such additional loads, the remote controlled mirrors are resistant to damage of component parts, and to damage which would negatively affect reliable operation. Moreover, the remote controlled mirrors are designed to function under such additional loads with sufficient stability so that the need for re-adjustment is minimized or eliminated. The remote controlled mirrors are sufficiently robust to withstand the static and dynamic forces of an off road environment, protecting both the mirrors surface and the operating systems ability to function. The remote controlled mirrors are able to withstand the harmonic frequency's being introduced via the equipment, the ability to continue to operate after being repeatedly struck by falling & flying stones and rocks as well as surviving in a dusty and dirty atmosphere. The remote controlled mirrors can perform in the harsh environmental conditions where dust, dirt and debris are present and can interfere with moving parts and where extreme temperatures occur.

In addition to addressing the problems unique to mirror assemblies used in heavy equipment, a major design consideration involves minimization of the weight of the entire remote controlled mirror without compromising its ability to function properly and reliably. Minimizing weight is desirable because the remote controlled mirror comprises a fixed mounting bracket which most commonly is attached to a fixed mounting structure that extends from the heavy equipment. The full weight of the remote controlled mirror must be secured by the attachment of the fixed mounting bracket to the fixed mounting structure mirror assembly which must support the load of the remote controlled mirror under operating conditions with the attendant vibration and shock forces discussed above. Minimizing the load on the fastening components and mounting structure is desirable to ensure that the remote controlled mirror and remains securely fastened to the heavy equipment during operation with its attendant vibration and shock forces.

Balanced against the desire for minimize weight are the requirement that large sized mirrors be used. Mirrors of the size required are very heavy. Additional weight arises from the need to use other components which can function to move the mirror to achieve different angles for viewing and to support and hold the mirror in place under the load, forces and operating conditions without damaging the components by fracturing, deforming or otherwise damaging them such that they cannot properly function. Fabricating large versions of passenger vehicle mirrors using large components made of materials with sufficiently high load capacity and able to function under the severe operating conditions encountered routinely by heavy equipment results in a mirror design that is unacceptably heavy. Remote controlled mirrors provided herein are sufficiently light but are provided with design features to achieve robust and reliable performance without breakdown of component parts.

Given the extremely large size of the mirrors described herein, the remote controlled mirror must be designed to provide for precise start and stopping movement of mirrors with the mass and weight needed for this type of equipment. Being able to move and stop that much mass and weight "precisely" is extremely difficult and presents challenges which make scaling up small mirror designs undesirable due to their lack of precision when used with such large mirrors.

The remote controlled mirror can be described has five component structures which each have multiple components and/or features. These five component structures include three structural sections and two drive actuators. The three structural sections are: 1) a mirror assembly, 2) a dual axis pivot bracket, and 3) a fixed mounting bracket. The two drive actuators include a first drive actuator and a second drive actuator. The two drive actuators may be provided as separate components or as a unitary component which has two drive actuators, i.e. the capability to independently effect motion of the mirror assembly in two perpendicular directions. Typically, in operation, one drive actuator is used to adjust the mirror horizontally and one drive actuator is used to adjust the mirror vertically. The functional component that can effect movement in one direction and the functional component that can effect movement in the perpendicular direction may in some embodiments be two drive actuators integrated as a single "part" due to being housed within a single container and in some embodiments using power delivered from an external source by a single power conduit. Controlling the adjustment horizontally and vertically provides the operator with a wide range of reflective angles. The five components are attached to each other in a manner which allows movement of each component structure relative to the other with the exception of the component structure referred to as the "fixed mounting bracket" which does not move relative to the other components.

The dual axis pivot bracket provides pivotable attachment of the mirror assembly to the fixed mounting bracket that is attached to the heavy equipment. The dual axis pivot bracket is pivotably attached the mirror assembly and to the fixed mounting bracket so that the bracket can rotate about the x-axis and about the y-axis. In some embodiments, the dual axis pivot bracket is pivotably attached the mirror assembly along the x-axis and pivotably attached to the fixed mounting bracket along the y-axis. In some embodiments, the dual axis pivot bracket is pivotably attached the mirror assembly along the y-axis and pivotably attached to the fixed mounting bracket along the x-axis. In either so that the dual axis pivot bracket can rotate about the x-axis and about the y-axis.

Figure 1B:
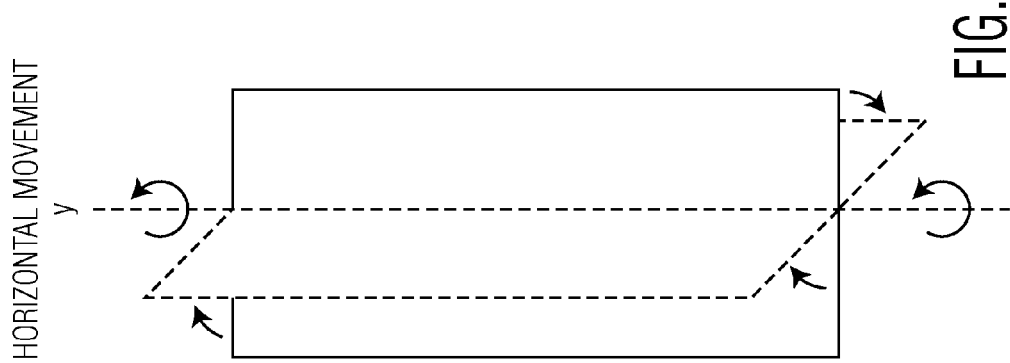

Horizontal movement refers to movement of the plane of the mirror such that the left and right edges of the mirror move in the opposite direction of each other. Thus, horizontal movement of the mirror refers to movement of mirror's horizontal or x-axis by rotating about the y-axis. When the plane of the mirror is rotating horizontally, the right and left edges move in opposite directions. As the mirror is moved horizontally by rotating it about its y axis, the operator adjusts/changes the horizontal view reflection. FIGS. 1A and 1B show horizontal movement of a plane. In FIG. 1A, the solid lined square represents the plane's start position and the dashed line represents the plane's finish position. The horizontally moving plane is depicted rotating about the y-axis (counter-clockwise when viewed looking down from the top of the y axis); from start position to finish position, the left edge of the plane moved toward the viewer and the right edge of the plane moved away from the viewer. In FIG. 1B, the solid lined square represents the plane's start position and the dashed line represents the plane's finish position. The horizontally moving plane is depicted rotating about the y-axis (clockwise when viewed looking down from the top of the y axis); from start position to finish position, the left edge of the plane moved away the viewer and the right edge of the plane moved toward from the viewer.

Figure 1C:
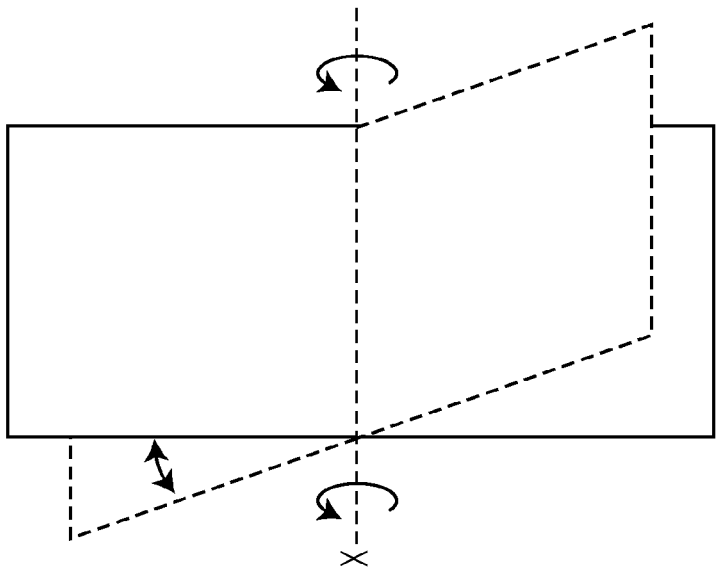
Figure 1D:
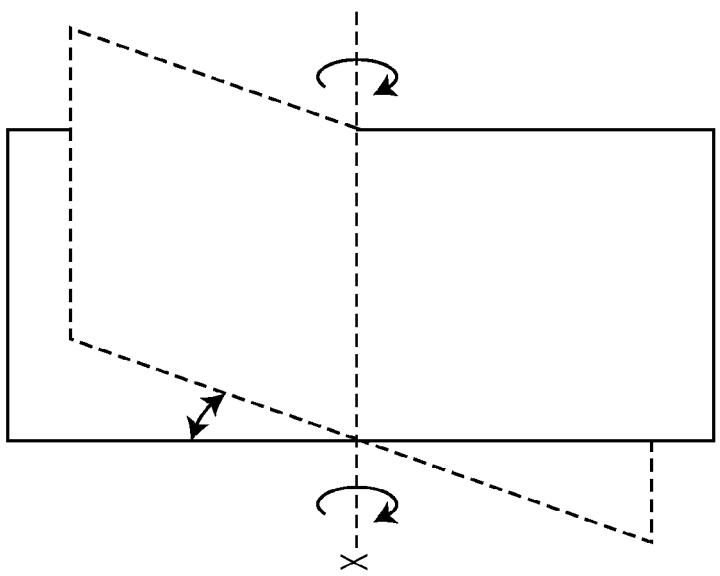

Vertical movement refers to movement of the plane of the mirror such that the top and bottom edges of the mirror move in the opposite direction of each other. Thus, vertical movement of the mirror refers to movement of mirror's vertical or y-axis by rotating about the x-axis. When the plane of the mirror is rotating vertically, the top and bottom edges move in opposite directions. As the mirror is moved vertically by rotating it about its x axis, the operator adjusts/changes the vertical view reflection. FIGS. 1C and 1D show vertical movement of a plane. In FIG. 1C, the solid lined square represents the plane's start position and the dashed line represents the plane's finish position. The vertical moving plane is depicted rotating about the y-axis (clockwise when viewed from the left end down the x axis); from start position to finish position, the top edge of the plane moved toward the viewer and the bottom edge of the plane moved away from the viewer. In FIG. 1D, the solid lined square represents the plane's start position and the dashed line represents the plane's finish position. The vertically moving plane is depicted rotating about the y-axis (counter-clockwise when viewed from the left end down the x axis); from start position to finish position, the top edge of the plane moved away the viewer and the bottom edge of the plane moved toward from the viewer.

Drive actuators are provided to effect movement of the dual axis pivot bracket. Activation of a horizontal drive actuator moves the plane of the mirror attached to the dual axis pivot bracket horizontally or in the horizontal direction. Activation of a vertical drive actuator moves the plane of the mirror attached to the dual axis pivot bracket vertically or in the vertical direction.

Unlike road able vehicles whose remote controlled mirrors utilize a rotary actuator, the remote controlled drive assembly which uses mechanical systems that work either independently or in conjunction with each other will minimize vibration or maintain the mirror's reflective surface motionless while the equipment is moving or idling. Further, the remote controlled drive assembly which uses mechanical systems that work either independently or in conjunction with each other facilitates the design's ability to precisely start and stop movement of mirrors with the mass and weight used. In some embodiments, the combination of using a tempered glass lens or metal reflective surface, an all steel mirror back, metal or alloy components for the actuating system, along with a steel or heavy gauge plastic protective shroud greatly enhances the system's ability to function in a variety of divers off road environments.

The mirror assembly may move horizontally, i.e. in the horizontal direction, by moving axially about the y-axis relative to the dual axis pivot bracket. The movement of the mirror assembly is effectuated by the action of the horizontal drive actuator.

The mirror assembly may move vertically, i.e. in the vertical direction, by moving axially about the x-axis relative to the dual axis pivot bracket. The movement of the mirror assembly is effectuated by the action of the vertical drive actuator.

The dual axis pivot bracket is in some embodiments essentially in the shape of a plus sign (+) when viewed from its front. The dual axis pivot brackets comprises a first longitudinal arm comprising a first longitudinal pivot connection tab, a second longitudinal arm comprising a second longitudinal pivot connection tab, a first lateral arm comprising a first lateral pivot connection tab, a second lateral arm comprising a second lateral pivot connection tab. The first longitudinal arm may be the upper longitudinal arm and the second longitudinal arm may be the lower longitudinal arm. The first lateral arm may be the left lateral arm and the second lateral arm may be the right lateral arm.

The dual axis pivot bracket attached to both the mirror assembly and the fixed mounting bracket. It can be made of any material that will not break, deform or otherwise fail during operation. Preferably it is made of the light material provided such material has sufficient strength to maintain its shape and rigidity under operating conditions. In some embodiments, it is made of aluminum, aluminum alloys, plate aluminum, cast aluminum, forged aluminum, steel, stainless steel, composite such as graphite composites, and other structural materials which have sufficient strength.

In some embodiments, the mirror assembly is attached either directly or indirectly to the dual axis pivot bracket. In some embodiments, the mirror assembly is attached either directly or indirectly to the longitudinal pivot connection tabs of dual axis pivot bracket. In some embodiments, the mirror assembly is attached either directly or indirectly to the lateral pivot connection tabs of dual axis pivot bracket.

In some embodiments, the upper longitudinal arm, and both lateral arms may be co-planar and the lower longitudinal arm may be offset and extending in a parallel plane. In some embodiments, the lower longitudinal arm, and both lateral arms may be co-planar and the upper longitudinal arm may be offset and extending in a parallel plane. In some embodiments, both longitudinal arms and both lateral arms may be co-planar.

The first longitudinal pivot connection of the first longitudinal arm and the second longitudinal pivot connection tab of the second longitudinal arm each extends substantially in the same direction as the other along the z axis and the first lateral pivot connection tab of the first lateral arm and the second lateral pivot connection tab of the second lateral arm each extends substantially in the same direction as the other along the z axis. In some embodiments, the longitudinal pivot connection tabs and the lateral pivot connection tabs each extends substantially in the same direction along the z axis. In some embodiments, the longitudinal pivot connection tabs each extends substantially in the one direction along the z axis and the lateral pivot connection tabs each extends substantially in the opposite direction.

The dual axis pivot bracket comprises two pivot bracket-to-drive actuator connector tabs including a first pivot bracket-to-drive actuator connector tab, and a second pivot bracket-to drive actuator connector tab. A pivot bracket-to-drive actuator connector tab may be a single extending member which can be used to connect the dual axis pivot bracket to a drive actuator or it may be two or more extending members. A pivot bracket-to-drive actuator connector tab may be opening in the dual axis pivot bracket for receiving attachment hardware to attach a drive actuator to the dual axis pivot bracket. A pivot bracket-to-drive actuator connector tab may be an integrated part of the dual axis pivot bracket or it may be attached to the dual axis pivot bracket by any suitable attachment configuration such as for example welding, riveting, bolting, etc. One of the two pivot bracket-to-drive actuator connector tabs is a pivot bracket-to-vertical actuator connector tab, and one of the two pivot bracket-to-drive actuator connector tabs is a pivot bracket-to-horizontal actuator connector tab. In some embodiments, the first pivot bracket-to-drive actuator connector tabs is a pivot bracket-to-vertical actuator connector tab, and the second pivot bracket-to-drive actuator connector tabs is a pivot bracket-to-horizontal actuator connector tab. In some embodiments, the first pivot bracket-to-drive actuator connector tabs is a pivot bracket-to-horizontal actuator connector tab, and the second pivot bracket-to-drive actuator connector tabs is a pivot bracket-to-vertical actuator connector tab. In some embodiments, the first pivot bracket-to-drive actuator connector tab connects the dual axis pivot bracket to a horizontal drive actuator connected to a mirror assembly. In some embodiments, the first pivot bracket-to-drive actuator connector tab connects the dual axis pivot bracket to a vertical drive actuator connected to a mirror assembly. In some embodiments, the first pivot bracket-to-drive actuator connector tab connects the dual axis pivot bracket to a horizontal drive actuator connected to fixed mounting bracket. In some embodiments, the first pivot bracket-to-drive actuator connector tab connects the dual axis pivot bracket to a vertical drive actuator connected to fixed mounting bracket. In some embodiments, the second pivot bracket-to-drive actuator connector tab connects the dual axis pivot bracket to a horizontal drive actuator connected to a mirror assembly. In some embodiments, the second pivot bracket-to-drive actuator connector tab connects the dual axis pivot bracket to a vertical drive actuator connected to a mirror assembly. In some embodiments, the second pivot bracket-to-drive actuator connector tab connects the dual axis pivot bracket to a horizontal drive actuator connected to fixed mounting bracket. In some embodiments, the second pivot bracket-to-drive actuator connector tab connects the dual axis pivot bracket to a vertical drive actuator connected to fixed mounting bracket. In preferred embodiments, the drive actuator is a drive actuator having a piston which extends upon activation. In some embodiments in which the two drive actuators are housed together, the housing may be attached the dual axis pivot bracket and the first pivot bracket-to-drive actuator tab and second pivot bracket-to-drive actuator tab are within the attached housing and connected to the first drive actuator and second drive actuator, respectively.

The mirror assembly component comprises a mirror, a mirror back and two or more mirror-pivot tabs. The remote controlled mirrors typically weigh 11-200 or more pounds, more typically 35-150 pounds, with the weight of the mirror itself making up a substantial portion of the weight. In some embodiments, the remote controlled mirror weighs about 76 pounds.

The mirror and mirror back may be integrated as a single piece or the mirror back may be designed to receive the mirror which fits within the mirror backing and can be secured. In some embodiments, a coating of either Chromium or Silver layered onto a substratum made of either glass or plastic or a highly polished aluminum surface will be utilized as the reflective mirror lens.

The mirrors may way in the range of greater than 10 pounds to 200 pounds of more, generally 20-125 pounds. Mirrors typically used weigh at least 20-80 pounds, in some embodiments, 25-50 pounds and in some case 100-125 lbs. In contrast, road able vehicles (e.g. cars, semi-tractors, RV's) whose outside rearview mirrors are relatively small weigh only a few pounds, typically 2-10 pounds. In some embodiments, the mirror is at least greater than 10 pounds, at least 12 pounds, at least 15 pounds, at least 16 pounds, at least 16.5 pounds, at least 18 pounds, at least 20 pounds, at least 24 pounds, at least 25 pounds, at least 28 pounds, at least 30 pounds, at least 32 pounds, at least 35 pounds, at least 38 pounds, at least 40 pounds, at least 42 pounds, at least 45 pounds, at least 46 pounds, at least 48 pounds, at least 50 pounds, at least 54 pounds, at least 55 pounds, at least 58 pounds, at least 60 pounds, at least 62 pounds, at least 65 pounds, at least 68 pounds, at least 70 pounds, at least 72 pounds, at least 75 pounds, at least 76 pounds, at least 78 pounds, at least 80 pounds, at least 84 pounds, at least 85 pounds, at least 88 pounds, at least 90 pounds, at least 92 pounds, at least 95 pounds, at least 98 pounds, at least 100 pounds, at least 102 pounds, at least 105 pounds, at least 106 pounds, at least 108 pounds, at least 112 pounds, at least 114 pounds, at least 115 pounds, at least 118 pounds, at least 120 pounds, at least 122 pounds, at least 125 pounds, at least 128 pounds, at least 130 pounds, at least 132 pounds, at least 135 pounds, at least 136 pounds, at least 138 pounds, at least 140 pounds, at least 144 pounds, at least 145 pounds, at least 148 pounds, at least 150 pounds, at least 152 pounds, at least 155 pounds, at least 158 pounds, at least 160 pounds, at least 162 pounds, at least 165 pounds, at least 166 pounds, at least 168 pounds, at least 170 pounds, at least 174 pounds, at least 175 pounds, at least 178 pounds, at least 180 pounds, at least 182 pounds, at least 185 pounds, at least 188 pounds, at least 190 pounds, at least 192 pounds, at least 195 pounds, at least 196 pounds, at least 198 pounds, at least 200 pounds, or more.

The preferred weight of the remote control mirror, excluding the remote controllers, is preferably no more than 10% greater, no more than 15% greater no more than 20% greater no more than 25% greater or no more than 30% greater than a comparable manual adjustable mirror. That is preferred weight dual axis pivot bracket, two drive actuators, connection hardware, pre-load mechanism preferably makes of less than 10% or less, 15% or less, 20% or less, 25% or less, or 30% or less of the total weight.

Mirrors typically are about 100 to 2000 square inches, for example about 350 to 1000 square inches or larger. In some embodiments, mirrors are about 100 square inches, about 150 square inches, about 200 square inches, about 250 square inches, about 300 square inches, about 350 square inches, about 400 square inches, about 450 square inches, about 500 square inches, about 550 square inches, about 600 square inches, about 650 square inches, about 700 square inches, about 750 square inches, about 800 square inches, about 850 square inches, about 900 square inches, about 950 square inches, about 1000 square inches, about 1050 square inches, about 1100 square inches, about 1150 square inches, about 1200 square inches, about 1250 square inches, about 1300 square inches, about 1350 square inches, about 1400 square inches, about 1450 square inches, about 1500 square inches, about 1550 square inches, about 1600 square inches, about 1650 square inches, about 1700 square inches, about 1750 square inches, about 1800 square inches, about 1850 square inches, about 1900 square inches, about 1950 square inches, about 2000 square inches, or larger.

Some typical dimensions include 15"×25", 16"×24", 12"×40", 15"×50", and 20"×50". Some dimensions include 10"×10", 10"×15", 10"×20", 10"×25", 10"×30", 10"×35", 10"×40", 10"×45", 10"×50", 12"×15", 12"×20", 12"×25", 12"×30", 12"×35", 12"×40", 12"×45", 12"×50", 15"×15", 15"×20", 15"×25", 15"×30", 15"×35", 15"×40", 15"×45", 15"×50", 20"×20", 20"×25", 20"×30", 20"×35", 20"×40", 20"×45", 20"×50", 25"×25", 25"×30", 25"×35", 25"×40", 25"×45", 25"×50", 30"×30", 30"×35", 30"×40", 30"×45", 30"×50", 35"×35", 35"×40", 35"×45", 35"×50", 45"×45", 45"×50", 12"×12", 12"×16", 12"×20", 12"×24", 12"×30", 12"×36", 12"×40", 12"×44", 12"×48", 16"×16", 16"×20", 16"×24", 16"×30", 16"×36", 16"×40", 16"×44", 16"×48", 20"×20", 20"×24", 20"×30", 20"×36", 20"×40", 20"×44", 20"×48", 24"×24", 24"×30", 24"×36", 24"×40", 24"×44", 24"×48", 30"×30", 30"×36", 30"×40", 30"×44", 30"×48", among others.

The mirror back can be made of any material that will not break, deform or otherwise fail during operation. Preferably it is made of the light material provided such material has sufficient strength to maintain its shape and rigidity under operating conditions. In some embodiments, it is made of aluminum, aluminum alloys, plate aluminum, cast aluminum, forged aluminum, steel, stainless steel, composite such as graphite composites, and other structural materials which have sufficient strength.

In some embodiments, the mirror assembly comprises a mirror and a slotted mirror back which comprises a retaining slot into which the mirror slides and is secured into the mirror back. In some embodiments, the mirror back further comprises a retaining clip which can be secured to the mirror back after the mirror is in place in order to keep the mirror secured in place. In some embodiments, the mirror back is fabricated of either metal or plastic or a combination of both. The mirror back houses the reflective lens and act as the actuating systems mounting surface and part of the attachment point of the entire mirror assembly to the dual axis pivot bracket system. In some embodiments, the mirror is provided with a mirror frame which is fixed about the perimeter of the mirror. The mirror frame may serve as an intermediate structure between the mirror itself and the slotted portion of the mirror back.

The mirror assembly further comprises two or more two mirror-pivot tabs attached to the mirror back including a first mirror-pivot tab and a second mirror pivot tab. The first mirror-pivot tab and the second mirror-pivot tab are configured to pivotably attach to one of the two pairs of pivot bracket connection tabs of the dual axis pivot bracket. The two mirror-pivot tabs may be integrated into the mirror back as part of a unitary structure. In some embodiments, the two mirror-pivot tabs are part of one or more mirror brackets which are attached to the mirror back. In some embodiments, the two mirror-pivot tabs are part of one mirror bracket which is attached to the mirror back by any attachment which can perform under operating conditions such as rivets, nuts and bolts, welds, etc. In some embodiments, the two mirror-pivot tabs are part of two or more mirror bracket which is attached to the mirror back by any attachment which can perform under operating conditions such as rivets, nuts and bolts, welds, etc. In some embodiments, the mirror assembly comprises 3 or more mirror-pivot tabs. In some embodiments, the mirror assembly comprises 3 or more mirror-pivot tabs as part of one, two or three mirror brackets. In some embodiments, mirror brackets are provided as two piece pairs. Thus, in some embodiments, the mirror assembly comprises 2 or more pairs of mirror brackets. In some embodiments, the mirror assembly comprises 3 or more pairs of mirror brackets.

The mirror pivot tabs serve as the connection interface between the mirror back and the dual axis pivot brackets. In some embodiments, the mirror pivot tabs are attached to a shaft which is attached to the dual axis pivot bracket. In some embodiments, a mirror bracket comprises a two mirror pivot tabs and a support base provided as a unitary article and attached to the mirror base. In some embodiments, a mirror bracket comprises a two mirror pivot tabs and a support base to which the mirror pivot tabs are attached and which is attached to the mirror base. The support base is connected to the mirror back and the mirror pivot tabs are connected directly or indirectly to pivot bracket tabs of the dual axis pivot bracket. The support base plays an important function in their connection to the mirror back. The support base spreads the load which is caused by the weight of the mirror at the attachment point of the support base to the mirror back plus the load when the mirror assembly is moved by the action of the drive actuator on the mirror assembly when the drive actuator is activated to axially move the mirror assembly. In some embodiments, the support base spreads the load which is caused by the weight of the mirror at the attachment point of the support base to the mirror back plus the load when the mirror assembly is moved by the action of the vertical drive actuator on the mirror assembly when the vertical drive actuator is activated to axially move the mirror assembly. In some embodiments, the support base spreads the load which is caused by the weight of the mirror at the attachment point of the support base to the mirror back plus the load when the mirror assembly is moved by the action of the horizontal drive actuator on the mirror assembly when the horizontal drive actuator is activated to axially move the mirror assembly.

The support base must have sufficient surface area at the point of contact with the mirror back. If the support base do not have sufficient surface area at the point of contact with the mirror back, the load will cause the mirror back to flex or otherwise deform. In some embodiments, the cumulative surface area of the support base at the point of contact with the mirror back is equal to or greater than about 20% of the surface area of the mirror back. In some embodiments, the cumulative surface area of the support base at the point of contact with the mirror back is equal to or greater than about 25% of the surface area of the mirror back. In some embodiments, the cumulative surface area of the support base at the point of contact with the mirror back is equal to or greater than about 30% of the surface area of the mirror back. In some embodiments, the cumulative surface area of the support base at the point of contact with the mirror back is equal to or greater than about 40% of the surface area of the mirror back. In some embodiments, the cumulative surface area of support base at the point of contact with the mirror back is equal to or greater than about 50% of the surface area of the mirror back. In some embodiments, the cumulative surface area of the support base at the point of contact with the mirror back is equal to or greater than about 60% of the surface area of the mirror back. In some embodiments, the cumulative surface area of the support base at the point of contact with the mirror back is equal to or greater than about 75% of the surface area of the mirror back. In some embodiments, the cumulative surface area of the support base at the point of contact with the mirror back is equal to or greater than about 80% of the surface area of the mirror back. In some embodiments, the cumulative surface area of the support base at the point of contact with the mirror back is equal to or greater than about 85% of the surface area of the mirror back. In some embodiments, the cumulative surface area of the support base at the point of contact with the mirror back is equal to or greater than about 90% of the surface area of the mirror back or more. The support base may be any shape which can effectively spread the load. In some preferred embodiments, the support tabs or support base is circular. In some preferred embodiments, the support tabs or support base is similar to the shape of the mirror base. In some preferred embodiments, the support tabs or support base is shaped like an "x" or a plus sign (+). In some embodiments, the mirror brackets are provided as pairs and each support of each mirror bracket of a pair of mirror brackets is a half circle.

In some embodiments, each mirror bracket comprises a support tab and a mirror pivot tab. In some embodiments, two or more mirror brackets are provided and each mirror bracket comprises a support tab and a mirror pivot tab. The support tab is connected to the mirror back and the mirror pivot tab is connected directly or indirectly to pivot tabs of the dual axis pivot bracket. The support tabs play an important function in their connection to the mirror back. The support tabs spread the load which is caused by the weight of the mirror at the attachment point of the support tab to the mirror back plus the load when the mirror assembly is moved horizontally by the action of the horizontal (y axis) drive actuator on the mirror assembly when the horizontal (y axis) drive actuator is activated to axially move the mirror assembly horizontally about the y axis. If the support tabs do not have sufficient surface area at the point of contact with the mirror back, the load will cause the mirror back to flex or otherwise deform. In some embodiments, the cumulative surface area of the support tabs at the point of contact with the mirror back is equal to or greater than about 30% of the surface area of the mirror back. In some embodiments, the cumulative surface area of the support tabs at the point of contact with the mirror back is equal to or greater than about 40% of the surface area of the mirror back. In some embodiments, the cumulative surface area of the support tabs at the point of contact with the mirror back is equal to or greater than about 50% of the surface area of the mirror back. In some embodiments, the cumulative surface area of the support tabs at the point of contact with the mirror back is equal to or greater than about 60% of the surface area of the mirror back. In some embodiments, the cumulative surface area of the support tabs at the point of contact with the mirror back is equal to or greater than about 75% of the surface area of the mirror back. The support tabs may be any shape which can effectively spread the load. In some preferred embodiments, the support tabs are circular. In some preferred embodiments, the mirror brackets are provided as pairs and each support of each mirror bracket of a pair of mirror brackets is a half circle.

The mirror bracket can be made of any material that will not break, deform or otherwise fail during operation. Preferably it is made of the light material provided such material has sufficient strength to maintain its shape and rigidity under operating conditions. In some embodiments, it is made of aluminum, aluminum alloys, plate aluminum, cast aluminum, forged aluminum, steel, stainless steel, composite such as graphite composites, and other structural materials which have sufficient strength.

The mirror assembly is connected directly or indirectly pivot bracket tabs of the dual axis pivot bracket. In some embodiments, the mirror assembly comprises a mirror bracket with two mirror-pivot tabs which are directly connected to the pivot bracket tabs of the dual axis pivot bracket using connectors which secure them but allow for axial rotation at the connection point of each mirror bracket or pair of mirror brackets. By this arrangement, the mirror assembly may move axially about an axis between the pivot bracket tabs of the dual axis pivot bracket. In some embodiments, the mirror-pivot tabs of the mirror assembly are attached to longitudinal pivot bracket connection tabs of the dual axis pivot bracket. In some embodiments, the mirror-pivot tabs of the mirror assembly are attached to lateral pivot bracket connection tabs of the dual axis pivot bracket some. The mirror assembly may be connected directly or indirectly to the longitudinal y-axis pivot tabs of the dual axis pivot bracket. In some embodiments, the mirror assembly comprises two mirror brackets or two pairs of mirror brackets, the mirror pivot tabs of which are directly connected to the longitudinally axis pivot tabs of the dual axis pivot bracket using connectors which secure them but allow for axial rotation at the connection point of each mirror bracket or pair of mirror brackets. By this arrangement, the mirror assembly may move horizontally at its x axis axially about a vertical or y axis between the two y axis pivot tabs of the dual axis pivot bracket. In some embodiments, a shaft is provided which is attached to the dual axis pivot bracket at each the longitudinal/y axis pivot tabs of the dual axis pivot bracket. The mirror brackets are connected to the shaft such as by passing the shaft through openings in the mirror pivot tabs of the mirror brackets. In such embodiments, the shaft is mounted to the dual axis pivot bracket to form as vertical or y axis about which the mirror assembly can move horizontally axially about the vertically axis. In some embodiments in which a shaft is provided, the mirror assembly comprises three or more mirror brackets or three or more pairs of mirror brackets. The mirror assembly may be connected directly or indirectly to lateral/x-axis pivot tabs of the dual axis pivot bracket. In some embodiments, the mirror assembly comprises two mirror brackets or two pairs of mirror brackets, the mirror pivot tabs of which are directly connected to the lateral/x-axis pivot tabs of the dual axis pivot bracket using connectors which secure them but allow for axial rotation at the connection point of each mirror bracket or pair of mirror brackets. By this arrangement, the mirror assembly may move vertically at its y axis axially about a horizontal or x axis between the two x axis pivot tabs of the dual axis pivot bracket. In some embodiments, a shaft is provided which is attached to the dual axis pivot bracket at each the lateral/x axis pivot tabs of the dual axis pivot bracket. The mirror brackets are connected to the shaft such as by passing the shaft through openings in the mirror pivot tabs of the mirror brackets. In such embodiments, the shaft is mounted to the dual axis pivot bracket to form as horizontal or x axis about which the mirror assembly can move vertically axially about the horizontal/x axis. In some embodiments in which a shaft is provided, the mirror assembly comprises three or more mirror brackets or three or more pairs of mirror brackets.

In some embodiments, the first mirror-pivot tab is pivotably attached to the first longitudinal pivot bracket connection tab, the second mirror-pivot tab is pivotably attached to the second longitudinal pivot bracket connection tab of the dual axis pivot bracket, the first mounting bracket-pivot tab is pivotably attached to the first lateral pivot bracket connection tab, the second mounting bracket-pivot tab is pivotably attached to the second lateral pivot bracket connection tab of the dual axis pivot bracket, the horizontal drive actuator is connected to both the mirror assembly and the dual axis pivot bracket and the vertical drive actuator is connected to both the fixed mounting bracket and the dual axis pivot bracket.

In some embodiments, the first mirror-pivot tab is pivotably attached to the first lateral pivot bracket connection tab, the second mirror-pivot tab is pivotably attached to the second lateral pivot bracket connection tab of the dual axis pivot bracket, the first mounting bracket-pivot tabs is pivotably attached to the first longitudinal pivot bracket connection tab, the second mounting bracket-pivot tab is pivotably attached to the second longitudinal pivot bracket connection tab of the dual axis pivot bracket, the vertical drive actuator is connected to both the mirror assembly and the dual axis pivot bracket and the horizontal drive actuator is connected to both the fixed mounting bracket and the dual axis pivot bracket.

In some embodiments, the mirror assembly also comprises a mirror assembly-to-actuator connector tab to which a drive actuator may be connected. In some embodiments, the mirror assembly-to-actuator connector tab is part of the mirror bracket. In some embodiments, the mirror assembly-to-actuator connector tab is attached to the mirror back. The mirror assembly-to-actuator connector tab may be provided with an opening to receive a connection assembly to connect it to a drive actuator. Such a connection assembly allows for the axial rotation of the drive actuator about the connection point where the mirror assembly-to-actuator connector tab and the drive actuator are connected.

The mirror assembly-to-actuator connector tab may be provided with an opening to receive a connection assembly to connect it to a horizontal drive actuator. Such a connection assembly allows for the axial rotation of the drive actuator about the connection point where the mirror assembly-to-actuator connector tab and the horizontal drive actuator are connected. The mirror assembly-to-actuator connector tab may be provided with an opening to receive a connection assembly to connect it to a vertical drive actuator. Such a connection assembly allows for the axial rotation of the drive actuator about the connection point where the mirror assembly-to-actuator connector tab and the vertical drive actuator are connected. In some embodiments, the mirror assembly may also comprises a y axis mirror assembly-to-actuator connector tab to which the y axis actuator may be connected. In some embodiments, the y axis mirror assembly-to-actuator connector tab is part of one of the mirror brackets or one of the pairs of mirror brackets. In some embodiments, the y axis mirror assembly-to-actuator connector tab is attached to the mirror back. The y axis mirror assembly-to-actuator connector tab may be provided with an opening to receive a connection assembly to connect it to the y axis actuator. Such a connection assembly allows for the axial rotation of the y axis actuator about the connection point where the y axis mirror assembly-to-actuator connector tab and the y axis actuator are connected. In some embodiments, the mirror assembly may also comprises an x axis mirror assembly-to-actuator connector tab to which the x axis actuator may be connected. In some embodiments, the x axis mirror assembly-to-actuator connector tab is part of one of the mirror brackets or one of the pairs of mirror brackets. In some embodiments, the y axis mirror assembly-to-actuator connector tab is attached to the mirror back. The x axis mirror assembly-to-actuator connector tab may be provided with an opening to receive a connection assembly to connect it to the x axis actuator. Such a connection assembly allows for the axial rotation of the x axis actuator about the connection point where the x axis mirror assembly-to-actuator connector tab and the x axis actuator are connected.

The mirror assembly-to-actuator connector tab can be made of any material that will not break, deform or otherwise fail during operation. Preferably it is made of the light material provided such material has sufficient strength to maintain its shape and rigidity under operating conditions. In some embodiments, it is made of aluminum, aluminum alloys, plate aluminum, cast aluminum, forged aluminum, steel, stainless steel, composite such as graphite composites, and other structural materials which have sufficient strength.

The fixed mounting bracket comprises two mounting bracket-pivot tabs, i.e. a first mounting bracket-pivot tab and a second mounting bracket-pivot tab, a mounting bracket-to-actuator connector tab, and two or more equipment connection tabs. In some embodiments, the first mounting bracket-pivot tab and the second mounting bracket-pivot tab of the fixed mounting bracket are connected to the first lateral pivot connection tab and the second lateral pivot connection tab, respectively, of the dual axis pivot bracket. The connection allows for the axial rotation of the dual axis pivot bracket horizontal axis which is formed by the connection of the first mounting bracket-pivot tab to the first lateral pivot connection tab and the connection of the second mounting bracket-pivot tab to the second lateral pivot connection tab, respectively. In some embodiments, the first mounting bracket-pivot tab and the second mounting bracket-pivot tab of the fixed mounting bracket are connected to the first longitudinal pivot connection tab and the second longitudinal pivot connection tab, respectively, of the dual axis pivot bracket. The connection allows for the axial rotation of the dual axis pivot bracket vertical axis which is formed by the connection of the first mounting bracket-pivot tab to the first longitudinal pivot connection tab and the connection of the second mounting bracket-pivot tab to the second longitudinal pivot connection tab, respectively.

In some embodiments, the first lateral pivot connection tab has a first lateral pivot connection tab opening and the second lateral pivot connection tab has a second lateral pivot connection tab opening which are in line with each other. Similarly, in some embodiments, the first x axis mounting bracket-pivot tab has a first x axis mounting bracket-pivot tab opening and the second x axis mounting bracket-pivot tab has a second x axis mounting bracket-pivot tab opening which are also in line with each other. The first lateral pivot connection tab opening and the first x axis mounting bracket-pivot tab opening receive a connection assembly to connect them to each other and the second lateral pivot connection tab opening and the second x axis mounting bracket-pivot tab opening receive a connection assembly to connect them to each other. Such connection assemblies allow for the axially rotation of the dual axis pivot bracket about the x axis of the connection points. The first x axis mounting bracket-pivot tab and the second x axis mounting bracket-pivot tab each extend along the z axis from 50% to the entire length of the fixed mounting bracket. In some embodiments, the first x axis mounting bracket-pivot tab and the second x axis mounting bracket-pivot tab each extend in the z axis about 75% of the entire length of the fixed mounting bracket. Having the first x axis mounting bracket-pivot tab and the second x axis mounting bracket-pivot tab extend from 50% to the entire length of the fixed mounting bracket results in a more rigid fixed mounting bracket for its weight. The fixed mounting bracket further comprises at least two and preferably three or more equipment connection tabs which extend along the z axis in the direction opposite that which the first mounting bracket-pivot tab and the second mounting bracket-pivot tab each extend.

The presence of at least two and preferably three or more equipment connection tabs which extend along the z axis in the direction opposite that which the first mounting bracket-pivot tab and the second mounting bracket-pivot tab each extend results in a more rigid fixed mounting bracket for its weight. Each equipment connection tabs is used to connect the remote controlled mirror to an equipment mounting arm present on the heavy equipment. Each equipment connection tabs performs an additional function of maintaining the integrity of the fixed mounting bracket under the load of the connected other components including when such load is subject to vibration and shock forces and the load that occurs when a drive actuator is activated and the combined mirror assembly, dual axis pivot bracket, the two drive actuators and all connectors including the shaft in embodiments comprising a shaft are rotated axially. The load is sufficient to deforms fixed mounted brackets of inadequate strength be that inadequate strength arise from the strength of the materials or design. The addition of equipment connection tabs, particularly when formed from the same unitary material as the fixed mounting plate serve to prevent fracturing, deformation, flexing or other changes in shape or integrity under the loads that occur in the maintenance and operation of the system as well as the load of having the entire remote controlled mirror attached to the equipment at the equipment mounting bracket. The fixed mounting bracket additionally comprises a mounting bracket-to-actuator connector tab which is used to connect the fixed mounting bracket to a drive actuator. The mounting bracket-to-actuator connector tab must have sufficient strength to maintain a large proportion of the combined load of mirror assembly, dual axis pivot bracket, two actuators and all connectors including the shaft that is provided in some embodiments. The load is shared with the two connection points where the dual axis pivot bracket connects to the fixed mounting bracket but a large share of the load is maintained by the mounting bracket-to-actuator connector tab. While the mounting bracket-to-actuator connector tab may be attached to the fixed mounting bracket such as by welding or connectors, typically, the mounting bracket-to-actuator connector tab is part of a unitary steel body that makes up the fixed mounting plate. Extra strength is imparted by having the tab as part of the unitary body. The mounting bracket-to-actuator connector tab must be sufficiently strong to resist damage or deformation when maintaining the load, when enduring shock forces and when enduring the load which occurs when the drive actuator is activated and the combined assembly of mirror assembly, dual axis pivot bracket, the two actuators and all connectors including the shaft that is provided in some embodiments are moved about the axis formed by the connection of each of the first mounting bracket-pivot tab of the fixed mounting bracket to the first lateral pivot connection tab of the dual axis pivot bracket and the second mounting bracket-pivot tab of the fixed mounting bracket to the second lateral pivot connection tab of the dual axis pivot bracket. In some embodiments, the structure comprising the equipment mounting connection tabs is a separate structure from the structure comprising the mounting bracket pivot tabs. These two structures form the mounting bracket and are joined by weld, rivets, and nuts and bolts for example. In some embodiments, the structure comprising the equipment mounting connection tabs is a same structure as the structure comprising the mounting bracket pivot tabs. In some embodiments, the equipment mounting connection tabs attach to a vertical structure on the heavy equipment. In some embodiments, the equipment mounting connection tabs attach to a horizontal structure on the heavy equipment.

In some embodiments, the fixed mounting bracket may comprise a first x axis mounting bracket-pivot tab, a second x axis mounting bracket-pivot tab, an x axis mounting bracket-to-actuator connector tab; and equipment connection tabs. The first x axis mounting bracket-pivot tab and the second x axis mounting bracket-pivot tab of the fixed mounting bracket may be connected to the first lateral pivot connection tab and the second lateral pivot connection tab, respectively, of the dual axis pivot bracket. The connection allows for the vertical movement by axial rotation of the dual axis pivot bracket about the horizontal or x axis which is formed by the connection of the first x axis mounting bracket-pivot tab to the first lateral pivot connection tab and the connection of the second x axis mounting bracket-pivot tab to the second lateral pivot connection tab, respectively. In some embodiments, the first lateral pivot connection tab has a first lateral pivot connection tab opening and the second lateral pivot connection tab has a second lateral pivot connection tab opening which are in line with each other. Similarly, the first x axis mounting bracket-pivot tab has a first x axis mounting bracket-pivot tab opening and the second x axis mounting bracket-pivot tab has a second x axis mounting bracket-pivot tab opening which are also in line with each other. The first lateral pivot connection tab opening and the first x axis mounting bracket-pivot tab opening receive a connection assembly to connect them to each other and the second lateral pivot connection tab opening and the second x axis mounting bracket-pivot tab opening receive a connection assembly to connect them to each other. Such connection assemblies allow for the vertical movement by axially rotation of the dual axis pivot bracket about the x axis of the connection points. The first x axis mounting bracket-pivot tab and the second x axis mounting bracket-pivot tab each extend along the z axis from 50% to the entire length of the fixed mounting bracket. In some embodiments, the first x axis mounting bracket-pivot tab and the second x axis mounting bracket-pivot tab each extend in the z axis about 75% of the entire length of the fixed mounting bracket. Having the first x axis mounting bracket-pivot tab and the second x axis mounting bracket-pivot tab extend from 50% to the entire length of the fixed mounting bracket results in a more rigid fixed mounting bracket for its weight. The fixed mounting bracket further comprises at least two and preferably three or more equipment connection tabs which extend along the z axis in the direction opposite that which the first x axis mounting bracket-pivot tab and the second x axis mounting bracket-pivot tab each extend. The presence of at least two and preferably three or more equipment connection tabs which extend along the z axis in the direction opposite that which the first x axis mounting bracket-pivot tab and the second x axis mounting bracket-pivot tab each extend results in a more rigid fixed mounting bracket for its weight. Each equipment connection tabs is used to connect the remote controlled mirror to an equipment mounting arm present on the heavy equipment. Each equipment connection tabs performs an additional function of maintaining the integrity of the fixed mounting bracket under the load of the connected other components including when such load is subject to vibration and shock forces and the load that occurs when the x drive actuator is activated and the combined mirror assembly, dual axis pivot bracket, y drive actuator, x drive actuator and all connectors including the shaft in embodiments comprising a shaft are moved vertically by rotation axially about the x axis. The load is sufficient to deforms fixed mounted brackets of inadequate strength be that inadequate strength arise from the strength of the materials or design. The addition of equipment connection tabs, particularly when formed from the same unitary material as the fixed mounting plate serve to prevent fracturing, deformation, flexing or other changes in shape or integrity under the loads that occur in the maintenance and operation of the system as well as the load of having the entire remote controlled mirror attached to the equipment at the equipment mounting bracket. The fixed mounting bracket additionally comprises an x axis mounting bracket-to-actuator connector tab which is used to connect the fixed mounting bracket to an x axis drive actuator. The x axis mounting bracket-to-actuator connector tab must have sufficient strength to maintain a large proportion of the combined load of mirror assembly, dual axis pivot bracket, y axis actuator and x axis actuator and all connectors including the shaft that is provided in some embodiments. The load is shared with the two connection points where the dual axis pivot bracket connects to the fixed mounting bracket but a large share of the load is maintained by the x axis mounting bracket-to-actuator connector tab. While the x axis mounting bracket-to-actuator connector tab may be attached to the fixed mounting bracket such as by welding or connectors, typically, the x axis mounting bracket-to-actuator connector tab is part of a unitary steel body that makes up the fixed mounting plate. Extra strength is imparted by having the tab as part of the unitary body. The x axis mounting bracket-to-actuator connector tab must be sufficiently strong to resist damage or deformation when maintaining the load, when enduring shock forces and when enduring the load which occurs when the x axis drive actuator is activated and the combined assembly of mirror assembly, dual axis pivot bracket, y axis actuator and x axis actuator and all connectors including the shaft that is provided in some embodiments are moved about the x axis formed by the connection of each of the first x axis mounting bracket-pivot tab of the fixed mounting bracket to the first lateral pivot connection tab of the dual axis pivot bracket and the second x axis mounting bracket-pivot tab of the fixed mounting bracket to the second lateral pivot connection tab of the dual axis pivot bracket.

In some embodiments, the fixed mounting bracket may comprise a first y axis mounting bracket-pivot tab, a second y axis mounting bracket-pivot tab, a y axis mounting bracket-to-actuator connector tab; and equipment connection tabs. The first y axis mounting bracket-pivot tab and the second y axis mounting bracket-pivot tab of the fixed mounting bracket may be connected to the first longitudinal pivot connection tab and the second longitudinal pivot connection tab, respectively, of the dual axis pivot bracket. The connection allows for the horizontal movement by axial rotation of the dual axis pivot bracket about the vertical or y axis which is formed by the connection of the first y axis mounting bracket-pivot tab to the first lateral pivot connection tab and the connection of the second y axis mounting bracket-pivot tab to the second lateral pivot connection tab, respectively. In some embodiments, the first longitudinal pivot connection tab has a first longitudinal pivot connection tab opening and the second longitudinal pivot connection tab has a second longitudinal pivot connection tab opening which are in line with each other. Similarly, the first y axis mounting bracket-pivot tab has a first y axis mounting bracket-pivot tab opening and the second y axis mounting bracket-pivot tab has a second y axis mounting bracket-pivot tab opening which are also in line with each other. The first longitudinal pivot connection tab opening and the first y axis mounting bracket-pivot tab opening receive a connection assembly to connect them to each other and the second longitudinal pivot connection tab opening and the second y axis mounting bracket-pivot tab opening receive a connection assembly to connect them to each other. Such connection assemblies allow for the horizontal movement by axially rotation of the dual axis pivot bracket about the y axis of the connection points. The first y axis mounting bracket-pivot tab and the second y axis mounting bracket-pivot tab each extend along the z axis from 50% to the entire length of the fixed mounting bracket. In some embodiments, the first y axis mounting bracket-pivot tab and the second y axis mounting bracket-pivot tab each extend in the z axis about 75% of the entire length of the fixed mounting bracket. Having the first y axis mounting bracket-pivot tab and the second y axis mounting bracket-pivot tab extend from 50% to the entire length of the fixed mounting bracket results in a more rigid fixed mounting bracket for its weight. The fixed mounting bracket further comprises at least two and preferably three or more equipment connection tabs which extend along the z axis in the direction opposite that which the first y axis mounting bracket-pivot tab and the second y axis mounting bracket-pivot tab each extend. The presence of at least two and preferably three or more equipment connection tabs which extend along the z axis in the direction opposite that which the first y axis mounting bracket-pivot tab and the second y axis mounting bracket-pivot tab each extend results in a more rigid fixed mounting bracket for its weight. Each equipment connection tabs is used to connect the remote controlled mirror to an equipment mounting arm present on the heavy equipment. Each equipment connection tabs performs an additional function of maintaining the integrity of the fixed mounting bracket under the load of the connected other components including when such load is subject to vibration and shock forces and the load that occurs when the y drive actuator is activated and the combined mirror assembly, dual axis pivot bracket, x drive actuator, y drive actuator and all connectors including the shaft in embodiments comprising a shaft are rotated axially in the horizontal about the y axis. The load is sufficient to deforms fixed mounted brackets of inadequate strength be that inadequate strength arise from the strength of the materials or design. The addition of equipment connection tabs, particularly when formed from the same unitary material as the fixed mounting plate serve to prevent fracturing, deformation, flexing or other changes in shape or integrity under the loads that occur in the maintenance and operation of the system as well as the load of having the entire remote controlled mirror attached to the equipment at the equipment mounting bracket. The fixed mounting bracket additionally comprises a y axis mounting bracket-to-actuator connector tab which is used to connect the fixed mounting bracket to a y axis drive actuator. The y axis mounting bracket-to-actuator connector tab must have sufficient strength to maintain a large proportion of the combined load of mirror assembly, dual axis pivot bracket, y axis actuator and y axis actuator and all connectors including the shaft that is provided in some embodiments. The load is shared with the two connection points where the dual axis pivot bracket connects to the fixed mounting bracket but a large share of the load is maintained by the y axis mounting bracket-to-actuator connector tab. While the y axis mounting bracket-to-actuator connector tab may be attached to the fixed mounting bracket such as by welding or connectors, typically, the y axis mounting bracket-to-actuator connector tab is part of a unitary steel body that makes up the fixed mounting plate. Extra strength is imparted by having the tab as part of the unitary body. The y axis mounting bracket-to-actuator connector tab must be sufficiently strong to resist damage or deformation when maintaining the load, when enduring shock forces and when enduring the load which occurs when the y axis drive actuator is activated and the combined assembly of mirror assembly, dual axis pivot bracket, x axis actuator and y axis actuator and all connectors including the shaft that is provided in some embodiments are moved about the y axis formed by the connection of each of the first y axis mounting bracket-pivot tab of the fixed mounting bracket to the first longitudinal pivot connection tab of the dual axis pivot bracket and the second y axis mounting bracket-pivot tab of the fixed mounting bracket to the second longitudinal pivot connection tab of the dual axis pivot bracket.

The fixed mounting bracket can be made of any material that will not break, deform or otherwise fail during operation. Preferably it is made of the light material provided such material has sufficient strength to maintain its shape and rigidity under operating conditions. In some embodiments, it is made of aluminum, aluminum alloys, plate aluminum, cast aluminum, forged aluminum, steel, stainless steel, composite such as graphite composites, and other structural materials which have sufficient strength.

Two drive actuators are provided: a first drive actuator and a second drive actuator. One drive actuator is a horizontal drive actuator, and one drive actuator is a vertical drive actuator. Each drive actuator comprises a drive actuator piston end, a drive actuator remote control interface, a first drive actuator connector tab, and a second drive actuator connector tab. In some embodiments, the first drive actuator connects the is connected to the mirror assembly-to-actuator connector tab and to the first pivot bracket-to-drive actuator connector tab of the dual pivot bracket, and the second drive actuator is connected to the mounting bracket-to-actuator connector tab to the second pivot bracket-to-drive actuator connector tab of the dual pivot bracket. In some embodiments, the first drive actuator connects the is connected to the mounting bracket-to-actuator connector tab and to the first pivot bracket-to-drive actuator connector tab of the dual pivot bracket, and the second drive actuator is connected to the mirror assembly-to-actuator connector tab and to the second pivot bracket-to-drive actuator connector tab of the dual pivot bracket. In some embodiments, the first drive actuator is a horizontal drive actuator and the second drive actuator is a vertical drive actuator. In some embodiments, the first drive actuator is a vertical drive actuator and the second drive actuator is a horizontal drive actuator. One drive actuator is a horizontal drive actuator, and one drive actuator is a vertical drive actuator.

In some preferred embodiments, one or both drive actuators is a linear actuator. Each linear actuator comprises a linear actuator piston end, a linear actuator remote control interface, a first linear actuator connector tab, and a second linear actuator connector tab. The linear actuators in some embodiments have a stroke length of greater than 0.5 inches, 1 inch or greater, 1.5 inches or greater 2 inches or greater, 2.5 inches or greater, 3 inches or greater, 3.5 inches or greater, 4 inches or greater, 4.5 inches or greater, 5 inches or greater, 5.5 inches or greater or 6 inches or greater. In some embodiments, the linear actuators have a stroke length of between 0.5 and 6 inches or greater, between 0.75 and 5.5 inches, between 0.75 and 5 inches, between 0.75 and 4.5 inches, between 0.75 and 4 inches, between 0.75 and 3.5 inches, between 0.75 and 3 inches, between 0.75 and 2.5 inches, between 0.75 and 2 inches, between 0.75 and 1.5 inches, between 0.75 and 1 inch, between 1 and 6 inches or greater, between 1 and 5.5 inches, between 1 and 5 inches, between 1 and 4.5 inches, between 1 and 4 inches, between 1 and 3.5 inches, between 1 and 3 inches, between 1 and 2.5 inches, between 1 and 2 inches, between 1 and 1.5 inches In some preferred embodiments the linear actuator has a 1 inch stroke. Other stroke lengths can be used but a 1 inch stroke in some embodiments.

The drive actuators may be electric, hydraulic, pneumatic, servomotors and mechanical or otherwise powered to activate and effect the movement of the components to which it is attached. In some embodiments, the drive actuators are the same type, i.e. both may be electric, or both may be hydraulic, or both may be pneumatic, or both may servomotors, and or both may be mechanical or otherwise powered to activate and effect the movement of the components to which it is attached. In some embodiments, the drive actuators are different types, e.g.: one may be electric and the other is non-electric such as hydraulic, pneumatic, servomotor, mechanical or otherwise powered to activate and effect the movement of the components to which it is attached; one may be hydraulic and the other is non-hydraulic such as electric, pneumatic, servomotor, mechanical or otherwise powered to activate and effect the movement of the components to which it is attached; one may be pneumatic, and the other is non-pneumatic such as electric, hydraulic, servomotor, mechanical or otherwise powered to activate and effect the movement of the components to which it is attached; one may be a servomotor, and the other is not a servomotor such as electric, hydraulic, pneumatic, mechanical or otherwise powered to activate and effect the movement of the components to which it is attached; one may be a mechanical, and the other is non-mechanical such as electric, hydraulic, pneumatic, servomotor or otherwise powered to activate and effect the movement of the components to which it is attached. In some embodiments, non-electric drive actuators are electrically controlled. For example, a hydraulic drive actuator uses hydraulics to effect movement of the actuator. The hydraulic fluid which powers the hydraulic drive actuator may be contained within conduits that extend outside of the hydraulic drive actuator. Alternatively, electrical power may control the hydraulics. In such embodiments, the hydraulics may be contained within the hydraulic drive actuator and controlled by electrical power. Electrically controlled hydraulic drive actuators is an example of a combination of power sources used in drive actuators. Other combinations of two power sources may be used.

In some embodiments, both drive actuators are non-linear actuators. In some embodiments, one drive actuator is a non-linear actuator and one actuator is a linear actuator. In some embodiments, both actuators are linear actuators.

The linear actuators may be electric, hydraulic, pneumatic, servomotors and mechanical or otherwise powered to activate the movement of the piston and effect the movement. In some embodiments, the linear actuators are the same type, i.e. both may be electric, or both may be hydraulic, or both may be pneumatic, or both may servomotors, and or both may be mechanical or otherwise powered to activate and effect the movement of the components to which it is attached. In some embodiments, the linear actuators are different types, e.g.: one may be electric and the other is non-electric such as hydraulic, pneumatic, servomotor, mechanical or otherwise powered to activate and effect the movement of the components to which it is attached; one may be hydraulic and the other is non-hydraulic such as electric, pneumatic, servomotor, mechanical or otherwise powered to activate and effect the movement of the components to which it is attached; one may be pneumatic, and the other is non-pneumatic such as electric, hydraulic, servomotor, mechanical or otherwise powered to activate and effect the movement of the components to which it is attached; one may be a servomotor, and the other is not a servomotor such as electric, hydraulic, pneumatic, mechanical or otherwise powered to activate and effect the movement of the components to which it is attached; one may be a mechanical, and the other is non-mechanical such as electric, hydraulic, pneumatic, servomotor or otherwise powered to activate and effect the movement of the components to which it is attached. In some embodiments, two hydraulic linear actuators are provided. In some embodiments, two electric linear actuators are provided. In some embodiments, one hydraulic linear actuator is provided and one electric linear actuator is provided. In some embodiments, one hydraulic linear actuator is provided as the vertical drive actuator and one electric linear actuator is provided as the horizontal drive actuator.

In some preferred embodiments, the vertical drive actuator plays the critical roles of supporting much of the load of the mirror assembly, of effecting vertical movement with precision stopping, and of holding the mirror assembly in place during operation. These roles are critical because the load is significant and creates challenges in designing functional and durable devices. The vertical drive actuator bears a significant portion of the load and must be able to withstand the additional loads caused by shock including those as much as those with a g-force of as much as +5 g or more. Equally important, the vertical drive actuator is required to hold the load in place so it does not vibrate or move including when additional loads caused by shock including those as much as those with a g-force of as much as +5 g or more occur. The vertical drive actuator must have a sufficient capacity to move the mirror assembly and sufficient force to hold the mirror assembly in place. In this position, the entire device has a lower center of gravity and the load is a downward force away from the drive actuator. This arrangement provides particular effective results with respect to the various design challenges. In some embodiments, placement of the vertical drive actuator is positioned for connection to the lower longitudinal arm of the dual axis pivot bracket. In preferred embodiments, the vertical drive actuator is a linear drive actuator positioned for connection to the lower longitudinal arm.

The first or second drive actuator may be attached to the mirror assembly at the actuator-to-mirror assembly connector tab which connects to the mirror assembly-to-actuator connector tab of the mirror assembly. The actuator-to-mirror assembly connector tab may be provided with an opening to receive a connection assembly to connect it to the mirror assembly. Such a connection assembly allows for the axially rotation of the actuator about the connection point where the actuator-to-mirror assembly tab and the mirror assembly are connected. In some embodiments, both the mirror assembly-to-actuator connector tab and the actuator-to-mirror assembly tab are each provided with an opening to receive a connection assembly to connect them to each other. The first or second drive actuator is attached to the dual axis pivot bracket at the actuator-to-pivot bracket connector tab which connects to the pivot bracket-to-actuator connector tab of the dual axis pivot bracket. The actuator-to-pivot bracket connector tab may be provided with an opening to receive a connection assembly to connect it to the dual axis pivot bracket. Such a connection assembly allows for the axially rotation of the first or second drive actuator about the connection point where the actuator-to-pivot bracket connection tab and the dual axis pivot bracket are connected. In some embodiments, both pivot bracket-to-actuator connector tab and the actuator-to-pivot bracket connection tab are each provided with an opening to receive a connection assembly to connect to each other. The remote control interface may comprise the power source for the drive actuator whether it be electric, hydraulic, pneumatic, and mechanical or some other power supply which can activate the first or second drive actuator and cause the piston to extend or retract. In the case of an electric power source, such electric power is connector to a motor component of the y axis drive actuator. In the case of a hydraulic or pneumatic power source, such hydraulic power or pneumatic power is a liquid or gas, respectively, fluid conduit that is connected to the first or second drive actuator. In some embodiments, the first drive actuator is a horizontal drive actuator and the second drive actuator is a vertical drive actuator. In some embodiments, the first drive actuator is a vertical drive actuator and the second drive actuator is a horizontal drive actuator. One drive actuator is a horizontal drive actuator, and one drive actuator is a vertical drive actuator.

The first or second linear actuator may be attached to the mirror assembly at the actuator-to-mirror assembly connector tab which connects to the mirror assembly-to-actuator connector tab of the mirror assembly. The actuator-to-mirror assembly connector tab may be provided with an opening to receive a connection assembly to connect it to the mirror assembly. Such a connection assembly allows for the axially rotation of the actuator about the connection point where the actuator-to-mirror assembly tab and the mirror assembly are connected. In some embodiments, both the mirror assembly-to-actuator connector tab and the actuator-to-mirror assembly tab are each provided with an opening to receive a connection assembly to connect them to each other. The first or second linear actuator is attached to the dual axis pivot bracket at the actuator-to-pivot bracket connector tab which connects to the pivot bracket-to-actuator connector tab of the dual axis pivot bracket. The actuator-to-pivot bracket connector tab may be provided with an opening to receive a connection assembly to connect it to the dual axis pivot bracket. Such a connection assembly allows for the axially rotation of the first or second linear actuator about the connection point where the actuator-to-pivot bracket connection tab and the dual axis pivot bracket are connected. In some embodiments, both pivot bracket-to-actuator connector tab and the actuator-to-pivot bracket connection tab are each provided with an opening to receive a connection assembly to connect to each other. The remote control interface may comprise the power source for the linear actuator whether it be electric, hydraulic, pneumatic, and mechanical or some other power supply which can activate the first or second linear actuator and cause the piston to extend or retract. In the case of an electric power source, such electric power is connector to a motor component of the y axis linear actuator. In the case of a hydraulic or pneumatic power source, such hydraulic power or pneumatic power is a liquid or gas, respectively, fluid conduit that is connected to the first or second linear actuator. In some embodiments, the first linear actuator is a horizontal linear actuator and the second linear actuator is a vertical linear actuator. In some embodiments, the first linear actuator is a vertical linear actuator and the second linear actuator is a horizontal linear actuator. One linear actuator is a horizontal linear actuator, and one linear actuator is a vertical linear actuator.

In some embodiments, the remote controlled mirror further comprises one or more pre-load mechanism connecting the mirror assembly to the dual axis pivot bracket. The pre-load mechanism may be a strut, a spring, a shock absorber or other structure which puts a hold force on the mirror assembly from the dual axis pivot bracket. The pre-load mechanism may contribute to the elimination of vibration. A primary function is to prevent backlash when the additional load from shocks experienced during operation is encountered. As noted above, the vertical drive actuator bears a significant portion of the load and also uses force to hold the mirror assembly in place. The additional force associated with shock during normal operation can produce a backlash on the vertical actuator. The pre-load mechanism puts a hold force on the mirror assembly to reduce and essentially eliminate backlash. The pre-load mechanism may be a strut, a spring, a shock absorber or other structure which puts some force on the mirror assembly from the dual axis pivot bracket.

The pre-load mechanism preferably is attached parallel to the vertical drive actuator which moves the mirror in the vertical direction. The pre-load mechanism preferably is attached parallel to the vertical drive actuator that is a linear actuator which moves the mirror in the vertical direction. The hold force provided by the preload mechanism prevents reduces, neutralizes or otherwise off sets some of the negative effects of additional load caused by shock that occur during ordinary use. Such loads can be about +5 g-force and the presence of the pre-load mechanism with its hold force. The load from the weight of the mirror assembly on the vertical drive actuator is high and when the loads are multiplied due to shocks, the results could damage or destroy the components of the remote controlled mirror. The pre-load mechanism reduces and effectively eliminates the damaging effects of load increases due to shocks, rendering the remote controlled mirror more reliable, more precise and more durable.

In preferred embodiments, the vertical drive actuator connects the mirror assembly to the dual axis pivot bracket and is positioned below the connection of the mirror pivot tabs to the first lateral pivot bracket connection tab and the second lateral pivot bracket connection tab. In this position, the vertical drive actuator can be most effective, particularly when a preload mechanism is employed. Positioning the vertical drive actuator to by connect the mirror assembly to the dual axis pivot bracket below the connection of the mirror pivot tabs to the first lateral pivot bracket connection tab and the second lateral pivot bracket connection tab allows for gravity to assist in vertical movement allowing for actuators to achieve movement with reduced push and pull force by actuators. In preferred embodiments, the vertical drive actuator connecting the mirror assembly to the dual axis pivot bracket is a linear actuator and is positioned below the connection of the mirror pivot tabs to the first lateral pivot bracket connection tab and the second lateral pivot bracket connection tab. In this position, the vertical drive actuator can be most effective, particularly when a preload mechanism is employed.

The remote controlled mirror may comprise a housing made of one or more pieces which are fitted over the area between the mirror bracket assembly and the fixed mounting bracket. In some embodiments, the housing extends slightly over the mirror assembly so that the mirror assembly is recessed within the housing. In some embodiments, the housing extends to cover the rear of the fixed mounted plate and is provided with opening from which the equipment connection tabs extend out for connection to an equipment mounting bracket. Importantly, the mirror assembly should be able to move within the housing. In some embodiments, connection points and support structures are provided which serve as attachment points for the housing. The remote controlled mirror may comprise a shroud around the entire assembly fabricated of either metal or plastic or a combination of both which will protect the drive mechanisms and mirror surface from potential damage.

Connector assemblies may be simple connectors such as rivets, cotter pins or other connectors that allow for axially rotation or they may comprise more elaborate sets of components to facilitate smooth axial movement such a bushings etc. To withstand the temperature and other elements and exposure to the air-borne particulates, heavy duty connectors are preferred. Bronze oil impregnated thrust bearings are preferred in some embodiments. Hardened, heat treated fasteners are preferred in some embodiments.

In some embodiments a simple design is provided with six pivotable: two connecting the mirror assembly to the dual axis pivot bracket; two connecting the fixed mounting bracket to the dual axis pivot bracket; one connecting the vertical actuator the dual axis pivot bracket and either the mirror assembly or the fixed mounting bracket; and one connecting the horizontal actuator to the dual axis pivot bracket and either the mirror assembly or the fixed mounting bracket. When the vertical actuator is privotably connected to the dual axis pivot bracket, it is non-pivotably connected to either the mirror assembly or the fixed mounting bracket. When the vertical actuator is privotably connected to either the mirror assembly or the fixed mounting bracket, it is non-pivotably connected to the fixed mounting bracket. When the horizontal actuator is privotably connected to the dual axis pivot bracket, it is non-pivotably connected to either the mirror assembly or the fixed mounting bracket. When the horizontal actuator is privotably connected to either the mirror assembly or the fixed mounting bracket, it is non-pivotably connected to the fixed mounting bracket. If the horizontal actuator is connected to the mirror assembly and the dual axis pivot bracket, the vertical actuator must be connected to the fixed mounting bracket and the dual axis pivot bracket. If the vertical actuator is connected to the mirror assembly and the dual axis pivot bracket, the horizontal actuator must be connected to the fixed mounting bracket and the dual axis pivot bracket.

In some embodiments a simple design is provided with eight pivotable: two connecting the mirror assembly to the dual axis pivot bracket; two connecting the fixed mounting bracket to the dual axis pivot bracket; two connecting the vertical actuator to dual axis pivot bracket and either the mirror assembly or the fixed mounting bracket; and two connecting the horizontal actuator to the dual axis pivot bracket and either the mirror assembly or the fixed mounting bracket. If the horizontal actuator is connected to the mirror assembly and the dual axis pivot bracket, the vertical actuator must be connected to the fixed mounting bracket and the dual axis pivot bracket. If the vertical actuator is connected to the mirror assembly and the dual axis pivot bracket, the horizontal actuator must be connected to the fixed mounting bracket and the dual axis pivot bracket.

Remote controllers attached to the drive actuator remote control interface of each drive actuator may be provided and positioned at a location where the heavy equipment is operated so that the remote controlled mirror may be adjusted. The remote controller components are dependent upon the type of power used to drive the actuators. The remote controller may be an electronic joystick or a pair of switches used to control vertical drive actuator and the horizontal drive actuator. In preferred embodiments, remote controllers are attached to the linear actuator remote control interface of each linear actuator.

With respect to the materials used in fabricating structural components, and with respect to drive actuators used, with respect to the connector assemblies and with respect to the remote controllers and all other required or optional components, there is a preference to choose materials and components which can function reliably and without negative effects on performance or durability in weather conditions having temperatures between below −40° F. and above 150° F. The heavy equipment for which the remote controlled mirror is designed are often used in extreme climate conditions and the remote controlled mirror should be able to function temperatures between −40° F. and 150° F., and perhaps colder and hotter temperatures as well. In addition to functioning in such extreme temperatures the materials and components should be durable and not breakdown due to exposure to the extreme temperatures.

EXAMPLES

Example 1

FIG. 2 shows a representative remote controlled mirror to which a remote controller can be attached.

Mirror assembly 101 comprises a mirror 102, a mirror frame 103 (partially shown, complete mirror frame corresponds to perimeter of mirror) which covers the outer edge of the mirror 102, and a mirror back 104, which has a mirror bracket 105 comprising a first a first mirror-pivot tab 106 and a second mirror pivot tab 107. Mirror 102 is attached to mirror back 104. Mirror frame 103 which covers the outer edge of the mirror 102. Mirror bracket 105 comprising a first a first mirror-pivot tab 106 and a second mirror pivot tab 107 is attached to a mirror back 104 by a plurality of rivets 108.

Dual axis pivot bracket 110 comprises: a first longitudinal bracket arm 111 comprising a first longitudinal pivot bracket connection tab 112, a second longitudinal bracket arm 113 comprising a second longitudinal pivot bracket connection tab 114 with a first pivot bracket-to-linear actuator connector tabs 119, a first lateral bracket arm 115 comprising a first lateral pivot bracket connection tab 116, a second lateral bracket arm 117 comprising a second lateral pivot bracket connection tab 118, a first pivot bracket-to-linear actuator connector tab 119, and a second pivot bracket-to linear actuator connector tab 120.

The first mirror-pivot tab 106 on mirror bracket 105 is attached to the first lateral pivot bracket connection tab 116 of the a first lateral bracket arm 115 of the dual axis pivot bracket 110 by connectors 121 and the second mirror-pivot tab 107 on mirror bracket 105 is attached to the second lateral pivot bracket connection tab 118 of the a second lateral bracket arm 117 of the dual axis pivot bracket 110 by connectors 122 thereby allowing movement of mirror assembly 101 about an axis formed by the attachment of first mirror-pivot tab 106 to the first lateral pivot bracket connection tab 116 and the second mirror-pivot tab 107 to the second lateral pivot bracket connection tab 118.

A fixed mounting bracket 123 comprising a first mounting bracket-pivot tab 124 and a second mounting bracket-pivot tab 125, a first equipment connection tab 126, a second equipment connection tab 127 and a third equipment connection tab 128, and support rib 129 which is attached to mounting bracket-to-actuator connector tab 130.

The first mounting bracket-pivot tab 124 is pivotably attached to the first longitudinal pivot bracket connection tab 112 of the first longitudinal bracket arm 111 of the dual axis pivot bracket 110 by connectors 131, and the second mounting bracket-pivot tab 125 is pivotably attached to the second longitudinal pivot bracket connection tab 114 of the second longitudinal bracket arm 113 of the dual axis pivot bracket 110 by connectors 132. The dual axis pivot bracket 110 may rotate about an axis formed by the pivotable attachment of the first mounting bracket-pivot tab 124 of the fixed mounting bracket 123 to the first longitudinal pivot bracket connection tab 112 of the a first longitudinal bracket arm 111 of the dual axis pivot bracket 110 by connectors 131, and the pivotably attachment of the second mounting bracket-pivot tab 125 of the fixed mounting bracket 123 to the second longitudinal pivot bracket connection tab 114 of the second longitudinal bracket arm 113 of the dual axis pivot bracket 110 by connectors 132. The rotation about the axis provides horizontal movement of the dual axis pivot bracket 110 relative to the fixed mounting bracket 123.

A horizontal linear actuator 133 is provided to effect the horizontal movement of dual axis pivot bracket 110 relative to the fixed mounting bracket 123. A first horizontal linear actuator connector tab 134 (not visible) of the horizontal linear actuator 133 is attached to the mounting bracket-to-actuator connector tab 130 on support rib 129 of the fixed mounting bracket 123 by connectors 135. The second pivot bracket-to-linear actuator connector tab 120, which is the pivot bracket-to-horizontal actuator connector tab, of the dual axis pivot bracket 110 is attached to the second horizontal linear actuator connector tab 136 (not visible) of the horizontal linear actuator 133 by connectors 136.

A vertical linear actuator 139 is provided to effect the vertical movement of the mirror assembly 101 relative to the dual axis pivot bracket 110. A first vertical linear actuator connector tab 140 of the vertical linear actuator 139 is attached to the first pivot bracket-to-linear actuator connector tab 119, which is the pivot bracket-to-vertical actuator connector tab, of the dual axis pivot bracket 110 by connectors 141. A second vertical linear actuator connector tab 142 of the vertical linear actuator 139 is attached to a mirror assembly-to-actuator connector tab 143 which is attached to the mirror bracket 105 by connectors 144.

A pre-load mechanism in the form of a shock absorber 145 is attached to the mirror assembly 101 and the dual axis pivot bracket 110. The shock absorber 145 is attached to first pivot bracket-to-linear actuator connector tab 119/pivot bracket-to-vertical actuator connector tab of the dual axis pivot bracket 110 by connectors 141 (not shown, same connectors used to connect the first vertical linear actuator connector tab 140 of the vertical linear actuator 139 to the first pivot bracket-to-linear actuator connector tab 119/pivot bracket-to-vertical actuator connector tab. The shock absorber 145 is attached to the mirror bracket 105 of the mirror assembly 101 at the mirror assembly-to-actuator connector tab 143 by connectors 144 (not shown, same connectors used to connect the second vertical linear actuator connector tab 142 of the vertical linear actuator 139 to the mirror assembly-to-actuator connector tab 143 attached to the mirror bracket 105).

Upon activation of the horizontal linear actuator 133, the linear actuator piston end 137 (not shown) extends and the dual axis pivot bracket 110 rotates about an axis along the y axis and provides horizontal movement of the of the dual axis pivot bracket 110 relative to the fixed mounting bracket 123. The horizontal linear actuator 133 may be attached to a remote controller (not shown) by connection of the remote controller to the horizontal linear actuator remote control interface 138 (not visible).

Upon activation of the vertical linear actuator 139, the vertical linear actuator piston end 146 (not shown) extends and the dual axis pivot bracket 110 rotates about an axis along the x axis and provides vertical movement of the mirror assembly 101 relative to the dual axis pivot bracket 110. The vertical linear actuator 139 may be attached to a remote controller (not shown) by connection of the remote controller to the vertical linear actuator remote control interface 148 (not visible).

Figure 3:
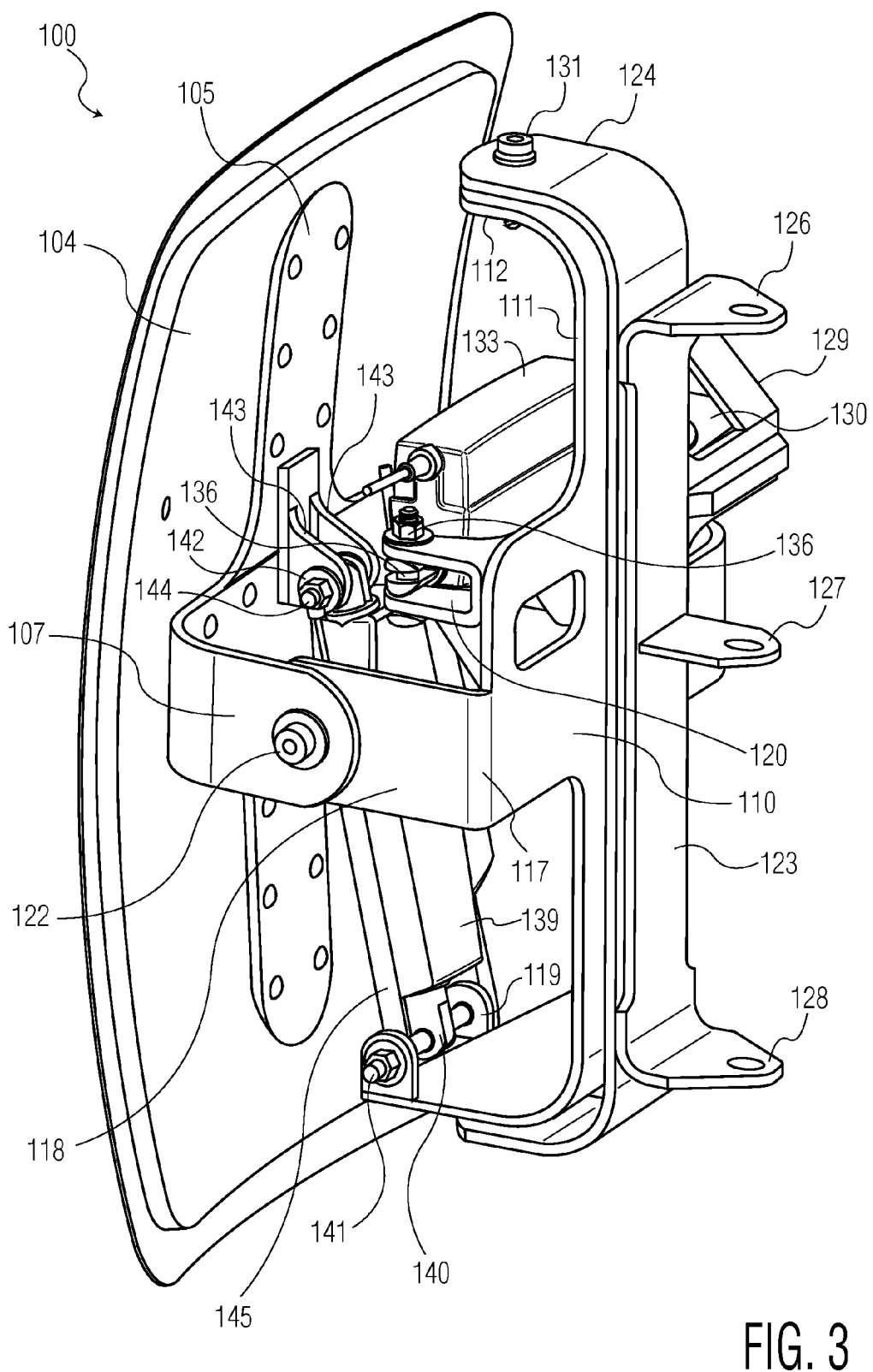
FIG. 3 shows a view of the assembled remote controlled mirror also shown in FIG. 2, to which a remote controller can be attached, showing a rear view of the left side, the mirror's reflective surface being the front view.

FIG. 3 shows a view of the assembled remote controlled mirror 100 also shown in FIG. 2, to which a remote controller can be attached, showing a rear view of the left side, the mirror's reflective surface being the front view. From the rear view mirror back 104 is shown as riveted to mirror bracket 105. Second mirror pivot tab 107 of mirror bracket 105 is pivotably connected to second lateral pivot bracket 118 of second lateral bracket arm 117 of the dual axis pivot bracket 110 by connectors 122.

Fixed mounting bracket 123, which includes the mounting bracket-to-actuator connector tab 130 (partially visible) on support rib 129, first equipment connection tab 126, second equipment connection tab 127 and third equipment connection tab 128, is shown pivotably attached at its first mounting bracket-pivot tab 124 to the first longitudinal pivot bracket connection tab 112 of the first longitudinal bracket arm 111 of the dual axis pivot bracket 110 by connectors 131.

The second horizontal linear actuator connector tab 136 of the horizontal linear actuator 133 is shown attached to second pivot bracket-to-linear actuator connector tab 120/pivot bracket-to-horizontal actuator connector tab of the dual axis pivot bracket 110 by connectors 136.

First vertical linear actuator connector tab 140 of the vertical linear actuator 139 and shock absorber 145 are each attached to the first pivot bracket-to-linear actuator connector tab 119/pivot bracket-to-vertical actuator connector tab of the dual axis pivot bracket 110 by connectors 141. Second vertical linear actuator connector tab 142 of the vertical linear actuator 139 is attached to mirror assembly-to-actuator connector tab 143 by connectors 144.

Figure 4:
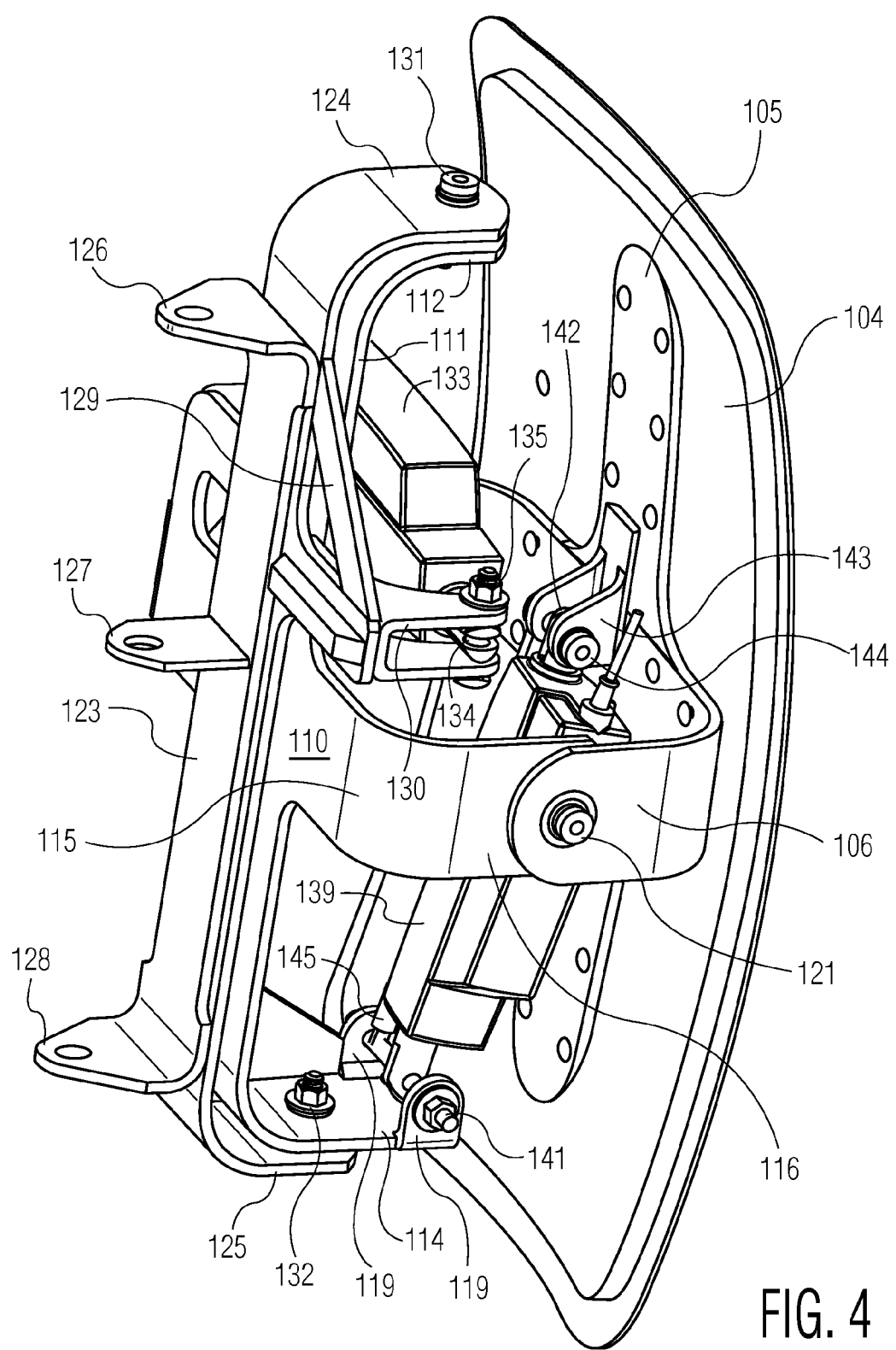
FIG. 4 shows a view of the assembled remote controlled mirror also shown in FIGS. 2 and 3, to which a remote controller can be attached, showing a rear view of the right side, the mirror's reflective surface being the front view.

FIG. 4 shows a view of the assembled remote controlled mirror 100 also shown in FIGS. 2 and 3, to which a remote controller can be attached, showing a rear view of the right side, the mirror's reflective surface being the front view. From the rear view mirror back 104 is shown as riveted to mirror bracket 105. First mirror pivot tab 106 of mirror bracket 105 is pivotably connected to first lateral pivot bracket 116 of first lateral bracket arm 115 of the dual axis pivot bracket 110 by connectors 121.

Fixed mounting bracket 123, which includes the mounting bracket-to-actuator connector tab 130, support arm 129, first equipment connection tab 126, second equipment connection tab 127 and third equipment connection tab 128, is shown pivotably attached at its first mounting bracket-pivot tab 124 to the first longitudinal pivot bracket connection tab 112 of the first longitudinal bracket arm 111 of the dual axis pivot bracket 110 by connectors 131. Fixed mounting bracket 123 is shown pivotably attached at its second mounting bracket-pivot tab 125 to the second longitudinal pivot bracket connection tab 114 of the second longitudinal bracket arm 113 of the dual axis pivot bracket 110 by connectors 132.

The first horizontal linear actuator connector tab 134 of the horizontal linear actuator 133 is shown attached to mounting bracket-to-actuator connector tab 130 on fixed mounting bracket 123 by connectors 135.

First vertical linear actuator connector tab 140 of the vertical linear actuator 139 and shock absorber 145 (partially visible) are each attached to the first pivot bracket-to-linear actuator connector tab 119/pivot bracket-to-vertical actuator connector tab of the dual axis pivot bracket 110 by connectors 141. Second vertical linear actuator connector tab 142 of the vertical linear actuator 139 is attached to mirror assembly-to-actuator connector tab 143 by connectors 144.

Figure 5:
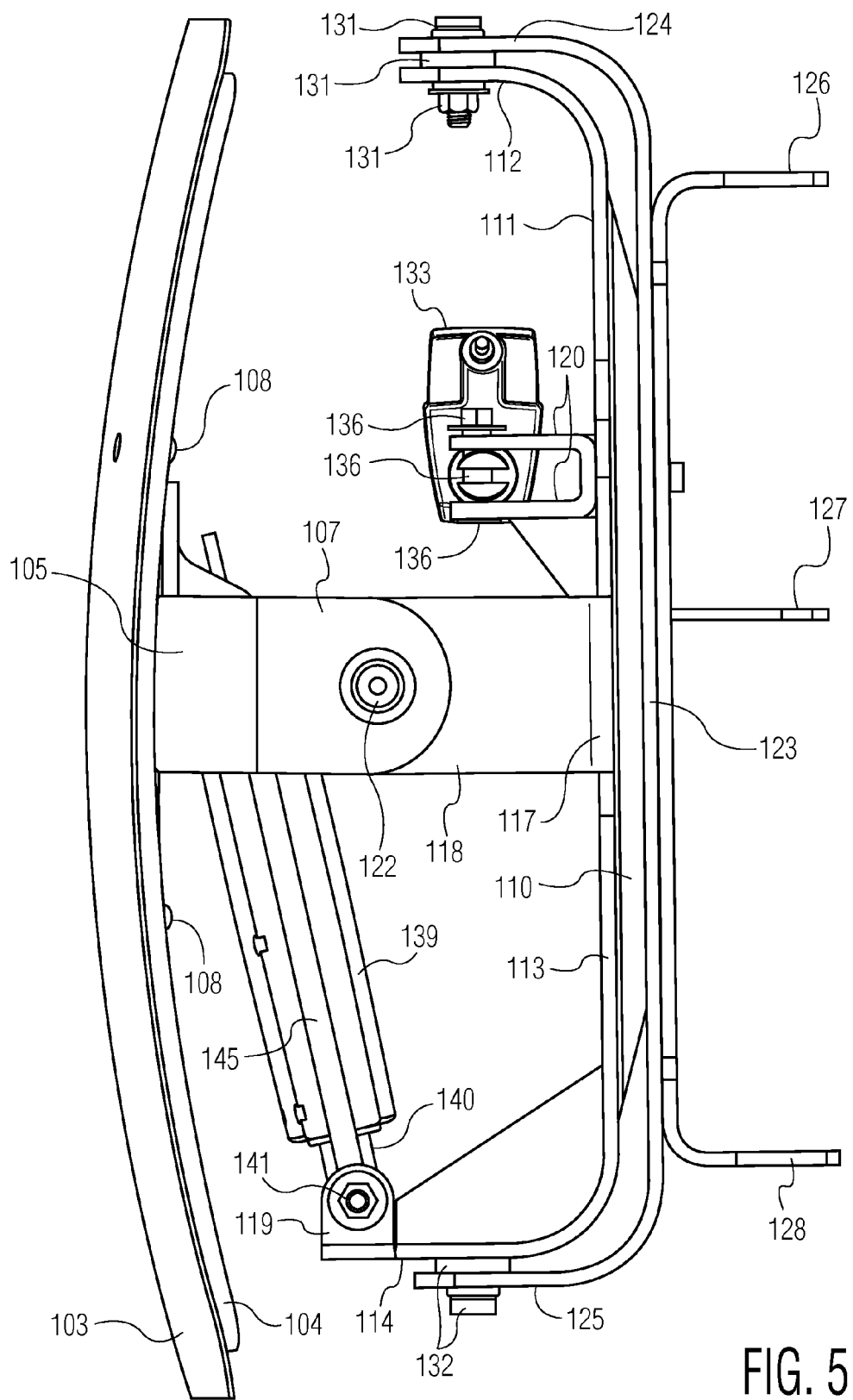
FIG. 5 shows a side view of the assembled remote controlled mirror also shown in FIGS. 2-4, to which a remote controller can be attached, shown from the right side of the assembled remote controlled mirror, the mirror's reflective surface being the front view.
Figure 6:
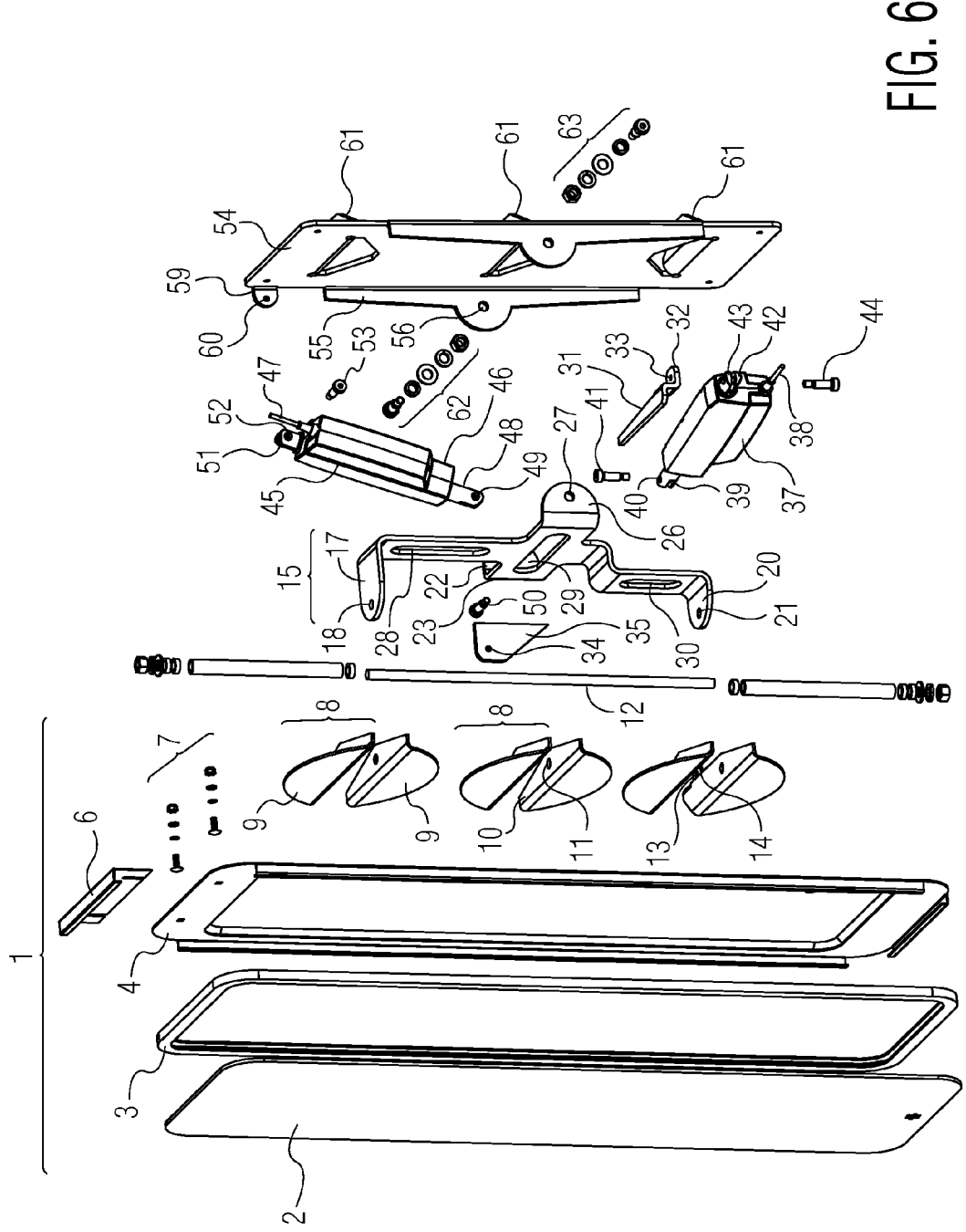
FIG. 6 depicts an alternative embodiment of a remote controlled assembly.

FIG. 5 shows the left side view of the assembled remote controlled mirror 100 also shown in FIGS. 2-4, to which a remote controller can be attached (the mirror's reflective surface being the front view). The mirror and mirror back 104 are shown together with a side view of the second mirror pivot tab 107 of mirror bracket 105 including two rivet heads of two rivets 108 riveting to mirror bracket 105 to mirror back 104. A portion of mirror assembly-to-actuator connector tab 143 is shown.

The second mirror pivot tab 107 of mirror bracket 105 is pivotably connected by connectors 122 to second lateral pivot bracket 118 of side view perspective of lateral bracket arm 116 of the dual axis pivot bracket 110.

Fixed mounting bracket 123, which includes first equipment connection tab 126, second equipment connection tab 127 and third equipment connection tab 128, is shown pivotably attached at its first mounting bracket-pivot tab 124 to the first longitudinal pivot bracket connection tab 112 of the first longitudinal bracket arm 111 of the dual axis pivot bracket 110 by connectors 131. Fixed mounting bracket 123 is shown pivotably attached at its second mounting bracket-pivot tab 125 to the second longitudinal pivot bracket connection tab 114 of the second longitudinal bracket arm 113 of the dual axis pivot bracket 110 by connectors 132.

The second horizontal linear actuator connector tab 136 of the horizontal linear actuator 133 is shown attached to second pivot bracket-to-linear actuator connector tab 120/pivot bracket-to-horizontal actuator connector tab of the dual axis pivot bracket 110 by connectors 136.

First vertical linear actuator connector tab 140 of the vertical linear actuator 139 and shock absorber 145 are each attached to the first pivot bracket-to-linear actuator connector tab 119/pivot bracket-to-vertical actuator connector tab of the dual axis pivot bracket 110 by connectors 141. Second vertical linear actuator connector tab 142 of the vertical linear actuator 139 is attached to mirror assembly-to-actuator connector tab 143 by connectors 144.

Example 2

In some embodiments, a remote controlled mirror is provided. The remote controlled mirror assembly comprises a) a mirror assembly; b) a dual axis pivot bracket; c) a y axis linear actuator; d) a fixed mounting bracket; and e) an x axis linear actuator. The remote controlled mirror optionally comprises a shaft useful to support the mirror assembly and allow it to rotate axially about the vertical axis created by its inclusion. The mirror assembly comprises a mirror with a fixed mirror back, the mirror weighing at least 25 pounds and having dimensions of a width of at least 12 inches and a height of at least 24 inches; a mirror back, and two or more mirror mounting brackets comprising a support tab and a mirror-pivot tab. The surface area of support tabs that is attached to the mirror back is at least 50% of surface area of mirror back surface. The mirror-pivot tab is used to attach the mirror assembly to a dual axis pivot bracket either directly or indirectly using an optional shaft. The mirror assembly further comprises a y axis mirror assembly-to-actuator connector tab which is used to connect the mirror assembly to a linear actuator in a manner which allows for the axial rotation of the linear actuator about the connector connecting the two structures. The dual axis pivot bracket comprising two longitudinal pivot connection tab which are preferably attached to two longitudinal arms and two lateral pivot tabs which are preferably attached to two lateral arms. The two longitudinal pivot connection tabs serve as the connection point to the mirror assembly. The two lateral pivot connection tabs serve as the connection point to the fixed mounted bracket. The dual axis pivot bracket further comprises an x axis pivot bracket-to-actuator connector tab to which an x axis linear actuator is rotatably attached and a y axis pivot bracket-to-actuator connector tab to which a y axis linear actuator is rotatably attached. A fixed mounting bracket comprises a first x axis mounting bracket-pivot tab which extends at least 50% of the length of the fixed mounting bracket, a second x axis mounting bracket-pivot tab which extends at least 50% of the length of the fixed mounting bracket, an x axis mounting bracket-to-actuator connector tab; and two or more equipment connection tabs. The first x axis mounting bracket-pivot tab and the second first x axis mounting bracket-pivot tab serve as the connection point for the two lateral pivot connection tabs of the dual axis pivot bracket. The connection is provided so that the dual axis pivot bracket can rotate axially between the two x axes mounting bracket-pivot tab when attached. The x axis mounting bracket-pivot tab extends at least 50% of the length of the fixed mounting bracket to provide strength to the fixed mounting bracket. The x axis mounting bracket-pivot tab may extend up to 75% or even along the full length of the fixed mounting bracket. The fixed mounting bracket provides at least two and preferably three of more equipment mounting tabs used to connect the remote controlled mirror to the equipment for which it will be used. The equipment mounting tabs serve the additional function of adding strength to the fixed mounting bracket. The fixed mounting bracket also comprises an x axis mounting bracket-to-actuator connector tab which serves as a site for attaching a linear actuator from it to the fixed mounting bracket. The x axis mounting bracket-to-actuator connector tab bears a disproportional amount of load of the entire power mirror assembly and must be capable of bearing such load. Two linear actuators are provided. Each comprises a piston end, and a remote control interface. One linear actuator comprises two connection sites, a y axis actuator-to-mirror assembly connector tab, and a y axis actuator-to-pivot bracket connector tab for connection of the linear actuator to the mirror assembly at the y axis mirror assembly-to-actuator connector tab and to the dual axis pivot bracket at the y axis pivot bracket-to-actuator connector tab. Each of these connections allows for the linear actuator to axially move about the connections site. The other linear actuator also comprises two connection sites, an x axis actuator-to-pivot bracket connector tab which connects the linear actuator to an x axis pivot bracket-to-actuator connector tab of the dual axis pivot bracket and an x axis actuator-to-mounting bracket connector tab which connects the linear actuator to an x axis mounting bracket-to-actuator connector tab on fixed mounting bracket. Each of these connections allows for the linear actuator to axially move about the connections site.

Example 3

FIG. 3 shows a representative remote controlled mirror which weighs about 76 pounds and has a mirror with dimensions of a width of about 12" wide and a height of 40" inches high.

Mirror assembly 1 comprises a mirror 2, a mirror frame 3 which covers the outer edge of the mirror 2, and a mirror back 4, which has a mirror slot 5 into which the mirror 2 within the mirror frame 3 are inserted. Retaining bracket 6 holds the mirror 2 within the mirror frame 3 within the mirror slot 5 of the mirror back 4. Two retaining bracket connector assemblies 7 are provided which fixedly attach the retaining bracket 6 to the mirror back 4.

Mirror assembly 1 has six mirror brackets 8 arranged as three pairs of mirror brackets 8. Each mirror bracket 8 comprises a support tab 9 in the shape of essentially a half circle and a mirror pivot tab 10. The support tab 9 attaches to the mirror back 4. The mirror pivot tab 10 comprises a mirror pivot tab opening 11 for receiving a y axis shaft 12. The mirror pivot tab opening 11 for each of the three pairs of mirror brackets 8 are in line with each other so that the y axis shaft 12 can pass through each of the mirror pivot tab openings 11 of each mirror bracket 8. The y axis shaft 12 may be a threaded shaft. The diameter of the mirror pivot tab opening 11 is slightly larger than the diameter of the y axis shaft 12 so that when the y axis shaft 12 is passed through the mirror pivot tab opening 11 of each mirror bracket 8 the mirror brackets 8, and thus the entire mirror assembly 1, can move axially about the y axis shaft 12.

Mirror assembly 1 also comprises a y axis mirror assembly-to-actuator connector tab 13 which has a y axis mirror assembly-to-actuator connector tab opening 14. While not fully visible in FIG. 1, the y axis mirror assembly-to-actuator connector tab 13 extends from two the mirror pivot tab 10 of a pair of the mirror pivot tabs 10 that make up a pair of mirror brackets 8.

Dual axis pivot bracket 15 is provided which comprises a first longitudinal arm 16 comprising a first longitudinal pivot connection tab 17 having a first longitudinal pivot connection tab opening 18, and a second longitudinal arm 19 comprising a second longitudinal pivot connection tab 20 having a second longitudinal pivot connection tab opening 21. The first longitudinal pivot connection tab 17 and the second longitudinal pivot connection tab 20 each extends forward along the z axis. Dual axis pivot bracket 15 also comprises a first lateral arm 22 comprising a first lateral pivot connection tab 23 having a first lateral pivot connection tab opening 24, and a second lateral arm 25 comprising a second lateral pivot connection tab 26 having a second lateral pivot connection tab opening 27. Each of the first lateral pivot connection tab 23 and the second lateral pivot connection tab 26 extends rearward along the z axis, i.e. in the opposite direction of the first longitudinal pivot connection tab 17 and the second longitudinal pivot connection tab 20. In this embodiment, the first longitudinal arm 16, the first lateral arm 22 and the second lateral arm 25 are co-planar and the second longitudinal arm 19 is offset and extending in a parallel plane and weight saving slots 28, 29 and 30 are also provided.

Dual axis pivot bracket 15 comprises a y axis actuator support bracket 31 which comprises a y axis pivot bracket-to-actuator connector tab 32 having a y axis pivot bracket-to-actuator connector tab opening 33. The y axis actuator support bracket 31 comprising a y axis pivot bracket-to-actuator connector tab 32 may be welded to the dual axis pivot bracket 15.

Dual axis pivot bracket 15 comprises an x axis pivot bracket-to-actuator connector tab 34 having an x axis pivot bracket-to-actuator connector tab opening 35. The x axis pivot bracket-to-actuator connector tab 34 may be welded to the dual axis pivot bracket 15.

The y axis linear actuator 36 comprises a y axis piston end 37, a y axis remote control interface 38, a y axis actuator-to-mirror assembly connector tab 39 having a y axis actuator-to-mirror assembly connector tab opening 40, a y axis actuator-to-mirror assembly connector assembly 41, a y axis actuator-to-pivot bracket connector tab 42 having a y axis actuator-to-pivot bracket connector tab opening 43 and a y axis actuator-to-pivot bracket connector assembly 44.

The x axis linear actuator 45 comprises an x axis piston end 46, an x axis remote control interface 47, an x axis actuator-to-pivot bracket connector tab 48 having an x axis actuator-to-pivot bracket connector tab opening 49, an x axis pivot bracket connector assembly 50, an x axis actuator-to-mounting bracket connector tab 51 having an x axis actuator-to-mounting bracket connector tab opening 52 and an x axis actuator-to-mounting bracket connector assembly 53.

The fixed mounting bracket 54 comprises a first x axis mounting bracket-pivot tab 55 having a first x axis mounting bracket-pivot tab opening 56, a second x axis mounting bracket-pivot tab 57 having a second x axis mounting bracket-pivot tab opening 58, an x axis mounting bracket-to-actuator connector tab 59 having an x axis mounting bracket-to-actuator connector tab opening 60 and three equipment connection tabs 61. First x axis mounting bracket-pivot tab 55 extends along the side of the fixed mounting bracket 54 a distance of about 75% of the distance of the side of the fixed mounting bracket 54 and second x axis mounting bracket-pivot tab 57 extends along the side of the fixed mounting bracket 54 a distance of about 75% of the distance of the side of the fixed mounting bracket 54.

The y axis linear actuator 36 is mounted to the dual axis pivot bracket 15 by connecting y axis pivot bracket-to-actuator connector tab 32 of y axis actuator support bracket 31 to y-axis actuator-to-pivot bracket connector tab 42 of linear actuator 36 using y axis actuator-to-pivot bracket connector assembly 44 and y axis pivot bracket-to-actuator connector tab opening 33 and y axis actuator-to-pivot bracket connector tab opening 43.

The assembled mirror assembly 1 comprises mirror 2 with mirror frame 3 extending about its outer edge inserted into mirror slots 5 of mirror back 4. The mirror 2 with mirror frame 3 is secured in mirror slots 5 by retaining bracket 6 using retaining bracket connector assemblies 7. The three pairs of mirror brackets 8 are secured to the rear of mirror back 4 by attaching supporting tab 9 of each mirror bracket 8 to the rear of mirror back 4. Y axis shaft 12 is inserted in the mirror pivot tab opening 11 of mirror pivot tab 10.

The mirror assembly 1 is connected to dual axis pivot bracket 15 by securely fastening one end of y axis shaft 12 into first longitudinal pivot connection tab opening 18 of first longitudinal pivot connection tab 17 of first longitudinal arm 16 and fastening the other end of y axis shaft 12 into second longitudinal pivot connection tab opening 21 of second longitudinal pivot connection tab 20 of second longitudinal arm 19.

The y axis linear actuator 36 which is attached to dual axis pivot bracket 15 at y axis actuator-to-pivot bracket connector tab 42 is attached to the mirror assembly 1 by connecting y axis actuator-to-mirror assembly connector tab 39 of linear actuator 36 to y-axis mirror assembly-to-actuator connector tab 13 of the mirror assembly 1 using y axis actuator-to-mirror assembly connector assembly 41 through y axis actuator-to-mirror assembly connector tab opening 40 and y axis mirror assembly-to-actuator connector tab opening 14.

Dual axis pivot bracket 15 is attached to fixed mounting bracket 54 by connecting first x axis mounting bracket-pivot tab 55 to first lateral pivot connection tab 23 of first lateral arm 22 using connector assembly 62 though first lateral pivot connection tab opening 24 of first lateral pivot connection tab 23 and first x axis mounting bracket-pivot tab opening 56 of first x axis mounting bracket-pivot tab 55 and by connecting second x axis mounting bracket-pivot tab 57 to second lateral pivot connection tab 26 of second lateral arm 25 using connector assembly 63 though second lateral pivot connection tab opening 27 of second lateral pivot connection tab 26 and second x axis mounting bracket-pivot tab opening 58 of second x axis mounting bracket-pivot tab 57.

The x axis linear actuator 45 is attached at x axis actuator-to-pivot bracket connector tab 48 to dual axis pivot bracket 15 at x axis pivot bracket-to-actuator connector tab 34 by using x axis pivot bracket connector assembly 50 through x axis pivot bracket-to-actuator connector tab opening 35 of x axis pivot bracket-to-actuator connector tab 34 and x axis actuator-to-pivot bracket connector tab opening 49 of x axis actuator-to-pivot bracket connector tab 48, and is attached to the fixed mounting bracket 54 by connecting x axis actuator-to-mounting bracket connector tab 51 of linear actuator 45 to x axis mounting bracket-to-actuator connector tab 59 of the fixed mounting bracket 54 using x axis actuator-to-mounting bracket connector assembly 53 through x axis actuator-to-mounting bracket connector tab opening 52 of x axis actuator-to-mounting bracket connector tab 51 and x axis mounting bracket-to-actuator connector tab opening 60 of x axis mounting bracket-to-actuator connector tab 59.

The invention claimed is:

1. A remote controlled mirror comprising:
   a) a dual axis pivot bracket comprising
      i) two pairs of pivot bracket connection tabs including
         (1) a first pair of pivot bracket connection tabs and
         (2) a second pair of pivot bracket connection tabs,
         wherein
            (a) one of the two pairs of pivot bracket connection tabs comprises
               (i) a first longitudinal pivot bracket connection tab and
               (ii) a second longitudinal pivot bracket connection tab, and
            (b) one of the two pairs of pivot bracket connection tabs comprises
               (i) a first lateral pivot bracket connection tab and
               (ii) a second lateral pivot bracket connection tab,
      ii) two pivot bracket-to-drive actuator connector tabs including
         (1) a first pivot bracket-to-drive actuator connector tab, and
         (2) a second pivot bracket-to drive actuator connector tab;
         wherein
            (1) one of the two pivot bracket-to-drive actuator connector tabs is a pivot bracket-to-vertical actuator connector tab, and
            (2) one of the two pivot bracket-to-drive actuator connector tabs is a pivot bracket-to-horizontal actuator connector tab;
   b) a mirror assembly comprising
      i) a mirror weighing at least 10 lbs and having dimensions of a width of at least 12 inches and a height of at least 24 inches;

ii) a mirror back, wherein the mirror is fixed to the mirror back, iii) two mirror-pivot tabs attached to the mirror back including (1) a first mirror-pivot tab and (2) a second mirror pivot tab, wherein the first mirror-pivot tab and the second mirror-pivot tab are configured to pivotably attach to one of the two pairs of pivot bracket connection tabs of the dual axis pivot bracket, iv) a mirror assembly-to-actuator connector tab;

c) a fixed mounting bracket comprising i) two mounting bracket-pivot tabs including (1) a first mounting bracket-pivot tab and (2) a second mounting bracket-pivot tab, wherein the first mounting bracket-pivot tab and the second mounting bracket-pivot tab are configured to pivotably attach to one of the two pairs of pivot bracket connection tabs of the dual axis pivot bracket, ii) a mounting bracket-to-actuator connector tab; and iii) two or more equipment connection tabs; and d) two drive actuators including i) a first drive actuator and ii) a second drive actuator, wherein (1) one drive actuator is a horizontal drive actuator, (2) one drive actuator is a vertical drive actuator, and (3) each drive actuator comprises (a) a drive actuator piston end, (b) a drive actuator remote control interface, (c) a first drive actuator connector tab, and (d) a second drive actuator connector tab;

wherein the first mirror-pivot tab and the second mirror-pivot tab are pivotably attached to the first pair of pivot bracket connection tabs of the dual axis pivot bracket;

the first mounting bracket-pivot tab and the second mounting bracket-pivot tab are pivotably attached to the second pair of the pivot bracket connection tabs of the dual axis pivot bracket;

the one drive actuator is connected to the mirror assembly-to-actuator connector tab and to the first pivot bracket-to-drive actuator connector tab of the dual pivot bracket, and one drive actuator is connected to the mounting bracket-to-actuator connector tab to the second pivot bracket-to-drive actuator connector tab of the dual pivot bracket.

2. The remote control mirror of claim 1 wherein the mirror assembly is connected to the lateral pivot bracket connection tabs of the dual axis pivot bracket, the fixed mounting bracket is attached to the longitudinal pivot bracket connection tabs of the dual axis pivot bracket, the vertical drive actuator is attached to the dual axis pivot bracket and the mirror bracket, the horizontal drive actuator is attached to the dual axis pivot bracket and the fixed mounting bracket, and further comprising a pre-load mechanism to hold vertical force from mirror assembly to the dual axis pivot bracket.

3. The remote controlled mirror of claim 2 wherein the vertical drive actuator is attached to a pivot bracket-to-vertical actuator connector tab that is attached to a longitudinal arm of the dual axis pivot bracket that extends below the dual axis pivot bracket's center, and the pre-load mechanism is attached to the mirror backing and to the dual axis pivot bracket at a position below the dual axis pivot bracket's center.

4. The remote controlled mirror of claim 1 wherein one or both drive actuators are linear actuators.

5. The remote controlled mirror of claim 1 wherein one or more of the dual axis pivot bracket, the fixed mounting bracket and the mirror back or one or more mirror brackets are made of aluminum.

6. The remote controlled mirror of claim 1 wherein one or more of the dual axis pivot bracket, the fixed mounting bracket and the mirror back or one or more mirror brackets are made of steel.

7. The remote controlled mirror of claim 1 comprising a single mirror bracket.

8. The remote controlled mirror of claim 1 further comprising housing that covers components to the rear of the mirror's reflective surface.

9. The remote controlled mirror of claim 1 further comprising a remote controller connected to the vertical drive actuator and the horizontal drive actuator.

10. The remote controlled mirror of claim 1 wherein the mirror weights 20 to 80 pounds.

11. The remote controlled mirror of claim 1 wherein the mirror weights more than 50 pounds.

12. The remote controlled mirror of claim 1 wherein one or more of the dual axis pivot bracket, the total weight further comprising a remote controller connected to the vertical drive actuator and the horizontal drive actuator, the dual axis pivot bracket, the first pivot bracket-to-drive actuator connector tab, the second pivot bracket-to drive actuator connector tab, the mirror assembly-to-actuator connector tab, and the mounting bracket-to-actuator connector tab have a combined weight of less than 25% of the remote controlled mirror total weight.

13. The remote controlled mirror of claim 1 wherein one or more of the dual axis pivot bracket, the total weight further comprising a remote controller connected to the vertical drive actuator and the horizontal drive actuator, the dual axis pivot bracket, the first pivot bracket-to-drive actuator connector tab, the second pivot bracket-to drive actuator connector tab, the mirror assembly-to-actuator connector tab, and the mounting bracket-to-actuator connector tab have a combined weight of less than 20% of the remote controlled mirror total weight.

14. The remote controlled mirror of claim 1 wherein one or both drive actuators are electric drive actuators, hydraulic drive actuators, pneumatic actuators or servomotors.

15. The remote controlled mirror of claim 1 wherein the first longitudinal pivot bracket connection tab is connected to first mirror-pivot tab, the second longitudinal pivot bracket connection tab is connected to second mirror-pivot tab, first lateral pivot bracket connection tab is connected to first mounting bracket-pivot tab, the second lateral pivot bracket connection tab is connected to second mounting bracket-pivot tab.

16. The remote controlled mirror of claim 1 wherein the first longitudinal pivot bracket connection tab is connected to first mounting bracket-pivot tab, the second longitudinal pivot bracket connection tab is connected to second mounting bracket-pivot tab, first lateral pivot bracket connection tab is connected to first mirror-pivot tab, the second lateral pivot bracket connection tab is connected to second mirror-pivot tab.

17. A remote controlled mirror comprising:

a) a mirror assembly comprising a mirror weighing at least 25 lbs and having dimensions of a width of at least 12 inches and a height of at least 24 inches;

a mirror back, wherein the mirror is fixed to the mirror back, two or more mirror mounting brackets, wherein each mirror mounting bracket comprises a support tab and a mirror-pivot tab, wherein the support tabs of the two or more mirror mounting brackets are attached to the mirror back, wherein cumulative surface area of support tabs is at least 50% of surface area of mirror back surface, and a y axis mirror assembly-to-actuator connector tab;

b) a dual axis pivot bracket comprising
 a first longitudinal pivot connection tab,
 a second longitudinal pivot connection tab
 a first lateral pivot bracket connection tab,
 a second lateral pivot bracket connection tab,
 an x axis pivot bracket-to-actuator connector tab, and
 a y axis pivot bracket-to-actuator connector tab; and c) a y axis linear actuator comprising
 a y axis piston end,
 a y axis remote control interface,
 a y axis actuator-to-mirror assembly connector tab, and
 a y axis actuator-to-pivot bracket connector tab; and d) a fixed mounting bracket comprising
 a first x axis mounting bracket-pivot tab which extends at least 50% of the length of the fixed mounting bracket,
 a second x axis mounting bracket-pivot tab which extends at least 50% of the length of the fixed mounting bracket,
 an x axis mounting bracket-to-actuator connector tab; and
 two or more equipment connection tabs; and e) an x axis linear actuator comprising
 an x axis piston end,
 an x axis remote control interface,
 an x axis actuator-to-pivot bracket connector tab, and
 an x axis actuator-to-mounting bracket connector tab wherein a y axis mirror-pivot tab of a mirror mounting bracket is pivotably attached to the first longitudinal pivot connection tab of the dual axis pivot bracket and another y axis mirror-pivot tab of another mirror mounting bracket is pivotably attached to the second longitudinal pivot connection tab of the dual axis pivot bracket such that the mirror assembly can axially move about a vertical axis between the first longitudinal pivot connection tab of the dual axis pivot bracket and the second longitudinal pivot connection tab of the dual axis pivot bracket whereby the mirror assembly is pivotably attached to the dual axis pivot about a vertical axis between the first longitudinal pivot connection tab of the dual axis pivot bracket and the second longitudinal pivot connection tab of the dual axis pivot bracket, wherein the y axis linear actuator is pivotably attached to the mirror assembly at the y axis mirror assembly-to-actuator connector tab of the mirror assembly and is pivotably attached to the dual axis pivot bracket at the y axis pivot bracket-to-actuator connector tab of the dual axis pivot bracket, wherein the dual axis pivot bracket is pivotably attached to the fixed mounting bracket by rotatable connection of the first x axis mounting bracket-pivot tab of the fixed mounting bracket to the first lateral pivot bracket connection tab of the dual axis pivot bracket and the rotatable connection of the second x axis mounting bracket-pivot tab of the fixed mounting bracket to the second lateral pivot bracket connection tab of the dual axis pivot bracket, wherein the dual axis pivot bracket can move about a horizontal axis between the first x axis mounting bracket-pivot tab of the fixed mounting bracket and second first x axis mounting bracket-pivot tab of the fixed mounting bracket wherein said x axis linear actuator is pivotably attached to the dual axis pivot bracket at the x axis pivot bracket-to-actuator connector tab of the dual axis pivot bracket and is pivotably attached to the fixed mounting bracket at the x axis mounting bracket-to-actuator connector tab.

18. The remote controlled mirror of claim 17 comprising a shaft connecting the first longitudinal pivot connection tab of the dual axis pivot bracket to the second longitudinal pivot connection tab of the dual axis pivot bracket and y axis mirror-pivot tabs of mirror mounting brackets pivotably attached to the shaft such that the mirror assembly can axially move about a vertical axis of the shaft between the first longitudinal pivot connection tab of the dual axis pivot bracket and the second longitudinal pivot connection tab of the dual axis pivot bracket whereby the mirror assembly is pivotably attached to the dual axis pivot about the vertical axis.

19. The remote controlled mirror of claim 17 comprising 3 pairs of mirror brackets.

20. The remote controlled mirror of claim 17 wherein cumulative surface area of support tabs is at least 75% of surface area of mirror back surface.

21. The remote controlled mirror of claim 2, wherein the pre-load mechanism is a strut, a spring or as absorber.

\* \* \* \* \*